United States Patent [19]
Cotton

[11] Patent Number: 5,488,272
[45] Date of Patent: Jan. 30, 1996

[54] DEFLECTION SYSTEM

[75] Inventor: John R. Cotton, Nr. Sheffield, United Kingdom

[73] Assignee: Rank Brimar Limited, United Kingdom

[21] Appl. No.: 15,571

[22] Filed: Feb. 9, 1993

[30]   Foreign Application Priority Data

Feb. 12, 1992 [GB] United Kingdom ............. 9202961
May 8, 1992 [GB] United Kingdom ............. 9211341

[51] Int. Cl.⁶ .................... H01J 29/70; H01J 29/76
[52] U.S. Cl. ........................... 315/408; 315/387
[58] Field of Search ................ 315/408, 389, 315/403, 387, 398; 358/214, 216

[56]    References Cited

U.S. PATENT DOCUMENTS

| | | |
|---|---|---|
| 3,650,448 | 3/1972 | Jarmy . |
| 3,814,981 | 6/1974 | Rusk . |
| 3,840,784 | 10/1974 | Schauffele . |
| 3,881,134 | 4/1975 | Haferl . |
| 3,914,654 | 10/1975 | Cooksey .................... 315/403 |
| 3,965,391 | 6/1976 | Lister . |
| 4,281,275 | 7/1981 | Chapman et al. ............ 315/399 |
| 4,400,652 | 8/1983 | Sunderland . |
| 4,468,593 | 8/1984 | Haferl ...................... 315/371 |
| 4,675,581 | 6/1987 | Dietz . |
| 5,087,863 | 2/1992 | Nero ........................ 315/387 |

FOREIGN PATENT DOCUMENTS 1475331  10/1974  United Kingdom .

*Primary Examiner*—Theodore M. Blum
*Attorney, Agent, or Firm*—Lerner, David, Littenberg, Krumholz & Mentlik

[57]    ABSTRACT

A CRT deflection circuit for use in a flying spot telecine scanner comprises a linear amplifier with a resonant flyback circuit and a flyback shift circuit comprising an inductive DC path carrying a DC offset current and a capacitor carrying the raster scan AC current to the flyback circuit. Since the DC offset current is not applied to the flyback circuit, the circuit can fly-back to non symmetrical beam positions, so that the entire scan can be displaced by a shift applied to the input of the amplifier.

23 Claims, 15 Drawing Sheets

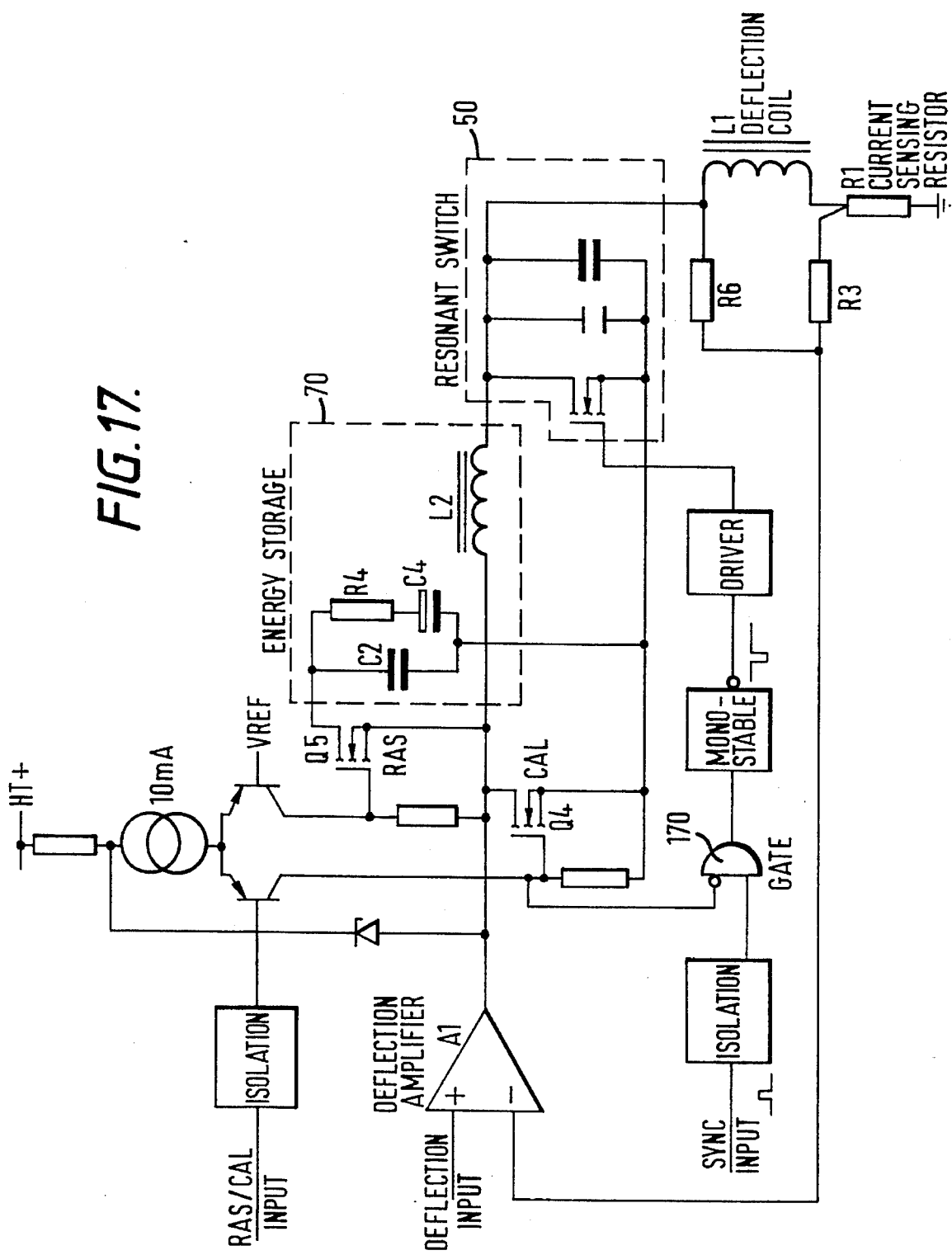

DEFLECTION SYSTEM

BACKGROUND OF THE INVENTION

1. Field of the Invention

This invention relates to an electron beam deflection system. The invention has particular, although not exclusive relevance to an electron beam deflection system for a cathode ray tube.

2. Description of the Prior Art

In cathode ray tube displays, the position of the electron beam is usually controlled by a deflection coil or yoke, the current through which creates a magnetic field deflecting the beam. Separate horizontal and vertical deflection arrangements are generally provided. In many cathode ray tube display systems, the display is provided as a raster scan, in which the beam is deflected in a first direction (usually horizontally) from one side of the scanned area of the screen to the other, and then flys back rapidly to commence a second scan in the first direction, but offset in the second direction (usually vertically).

The period provided for the flyback in video signals is generally short. In conventional television signals, for example, the horizontal scan period is 53 microseconds and the period for flyback is 11 microseconds.

The electron beam is generally directed to the centre of the scanning area of the screen. To produce a scan across the screen, a linearly ramping current is passed through the deflection coil, the centre of the ramp being at zero Amps. Since the coil exhibits inductance, the method of producing the ramp in conventional television receivers is to apply a high voltage across the coil, in response to which the current in the coil grows (almost) linearly. At the end of the scan, there is therefore a large current flowing through the coil. To achieve a rapid flyback, it is necessary to reverse the direction of current flow rapidly, to a large value of the opposite sign to that at the end of the scan, so as to bring the beam back to its starting point.

This is conventionally achieved in such television receiver circuits by providing a flyback capacitor which can be switched in circuit with the deflection coil, the capacitance being such that the LC circuit is resonant, with a resonant period of the order of twice the flyback period. At the end of the scan period, the resonant circuit is switched in. The current still flowing through the deflection yoke flows into the flyback capacitor, charging it up. When the inductor is drained and the capacitor is charged, the flyback capacitor starts to discharge through the inductor causing rapidly growing current in the opposite direction. The corresponding voltage across the capacitor during this period therefore rises from a near zero value at the end of the scan period to a high voltage when the inductor current is zero, and then falls back to a near zero level as the capacitor discharges through the deflection coil. After this, the resonant circuit would continue to oscillate, the voltage across the capacitor rising to a high value of opposite sign; to prevent this, a diode is connected across the capacitor to provide a shorting path for current flow in the reverse direction.

The next raster scan across the display area then commences, as before, and at the end of the scan the resonant circuit operates once more to return the beam to the start of the scan.

In other types of display system, for example those used in flight simulators, instead of providing a raster scanned display a calligraphic, vector or "stroke-writing" display is provided in which the beam position is directly controlled from a source of image information. In such applications, the deflection coil is connected to the output of a power amplifier, and the current through the deflection coil is sensed by a sensing resistor to provide a voltage which is fed back and subtracted from the input to the power amplifier, at which a beam controlling voltage signal is applied. The power amplifier thus supplies the current required to reduce the error between the current through the deflection coil and the current required by the corresponding controlling voltage. In fact, such an arrangement can also be used to provide a raster scan if the controlling voltage applied is a sawtooth. In U.S. Pat. Nos. 3,914,654 and 3,499,979, for example, a resonant circuit is provided in conjunction with the power amplifier so that when the power amplifier is operating to provide a raster scan, the flyback can be provided by the resonant circuit. Many modications to this circuit have been published; e.g. U.S. Pat. No. 4,590,408 and EP 0093447 which disclose use of a MOSFET to switch the resonant circuit.

One particular application of a CRT tube is in a telecine scanner. A telecine scanner is used to transfer films (transparencies) onto video tape. This is achieved by scanning each frame of the film with a point source of light, and collecting the light passing through the film in a photomultiplier, the output of which is formatted as a video signal for recording. The scanning point source of light is generated by a cathode ray tube known as a flying spot scanner. In a flying spot scanner, the screen is coated with a phosphor having very little persistence. The cathode ray beam is scanned in a raster pattern across the screen, so that the portion of the screen struck by the travelling beam glows only for a brief time, generating a scanning spot of light. The raster scan operates, typically, at video line and field rates. Modern feature films are designed to be shown on wide cinema screens. The aspect ratio of the film therefore does not match the aspect ratio of domestic television receivers, so that when the film is transferred to video only a part of the film is scanned. The scanned area can be moved by the telecine machine operator to follow the action of the film.

The deflection system for one known telecine machine comprises a horizontal deflection coil driven from a power amplifier, with feedback. The flyback is provided not by using a resonant circuit, but by continuing to operate the amplifier linearly. To modify the position of the raster scanned portion of the phosphor screen, and hence of the film, a DC offset voltage is added at the input to the power amplifier together with the raster generating sawtooth voltage.

Whilst this arrangement is satisfactory, we have realised that a problem will arise when high definition television (HDTV) becomes sufficiently widespread that there is a requirement to be able to transfer films onto tape in the new HDTV format. This will involve scanning at approximately twice the speed of present telecine machines, and will require twice the deflection power to be applied to the deflection coil because the time for flyback is halved. Power amplifiers are expensive, and the power dissipated will also be substantially higher, resulting in unwanted heat and consequential mechanical problems.

Nor is it possible to overcome this problem by using the known resonant flyback circuit of U.S. Pat. No. 3,914,654, for example. The reason for this is that such a circuit can only provide a symmetrical flyback, from one point on the screen to a point an equal distance on the opposite side of the centre of the screen (the centre being the point which corresponds to the position of the undeflected cathode ray beam). Thus, such a flyback circuit cannot deal with an offset scan such as is desirable in telecine machines as discussed above; for a small offset, the linear amplifier might be capable of restoring the beam position at the end of the resonant flyback, but the time taken to do so increases with the magnitude of the offset so that the flyback time as a whole may extend beyond the flyback period available, and beyond a certain level of offset the linear amplifier will be required to provide a greater degree of flyback than if the resonant circuit were not present at all. For this reason, flyback circuits are not considered for applications where an offset to the scan is required.

In U.S. Pat. No. 4,400,652, a magnetic deflection circuit for a CRT display is proposed in which a resonant flyback circuit is provided in combination with a linear feedback amplifier, as in U.S. Pat. No. 3,914,654. The time of firing of a semiconductor switch is controlled to truncate the flyback at some point before the end of the usual half-cycle, if it is desired for the flyback to be interrupted partway. However, there is no disclosure of means for producing a shifted raster scan using this arrangement. It appears that the arrangement would only provide for truncation of the flyback period, and not for an overshoot of the flyback, and hence that it can provide flyback only to a position closer to the centre of the screen than the starting point. Furthermore, since the rate of change of the flyback voltage is very steep, any slight inaccuracies in the timing of the interruption of flyback would result in substantial inaccuracies in the beam position at the end of flyback.

SUMMARY OF THE INVENTION

Accordingly, the present invention provides in one aspect an electron beam deflection system for connection to a deflection coil, the system comprising reasonant means which, when coupled with the deflection coil, will comprise a resonant flyback circuit, a deflection amplifier for energising the deflection coil with a deflection current, means for driving the amplifier with a raster scanning signal to scan the cathode ray, and means for supplying to the input of the amplifier a signal for shifting the scan position.

In another aspect, the present invention provides an electron beam deflection system for energising a deflection coil with a signal having a DC shift component and an AC scan component, comprising a resonant flyback circuit and means for decoupling the flyback circuit from the DC shift component.

In a preferred embodiment, the deflection system is incorporated in a telecine scanner together with a deflection coil and a cathode ray tube.

In another aspect, the invention comprises an electron beam deflection system for use with a deflection coil, the system comprising means which, with the coil, define a resonant circuit for providing a resonant flyback of the beam, a current path connected to the resonant circuit, and means for supplying or removing a current through said path during said flyback so as to cause the beam to return to a position which is not the mirror image of its position at the start of flyback.

A similar structure has been proposed to solve the opposite problem. For example, in U.S. Pat. No. 4,547,711, an auxiliary coil is energised during the linear scan period with a current which it discharges during the flyback period to provide an additional boost to charge the flyback capacitor, thus compensating for electrical loses in the resonant circuit and causing the flyback to return the beam to its exact mirror image position across the screen.

Viewed in another aspect, the invention consists in a cathode ray tube deflection system comprising a deflection amplifier, to the input of which a symmetrical scan signal and an offset signal may be applied, a deflection coil energised by current from the amplifier, a dividing node downstream of the amplifier for separating the offset portion of the output thereof and means for connecting the deflection coil during a flyback period to a capacitance to energise the deflection coil with a combination of the offset current and a resonating current.

Other aspects and embodiments of the invention are as described hereafter in the description or the appended claims, with advantages that will be apparent from the following.

BRIEF DESCRIPTION OF THE DRAWINGS

A number of embodiments of the invention will now be described, by way of example only, with reference to the accompanying drawings, in which:

FIG. 17 is a schematic circuit diagram of a particular implementation of the embodiment illustrated in FIG. 15.

KNOWN DEFLECTION AMPLIFIER WITH SHIFT

Figure 1:
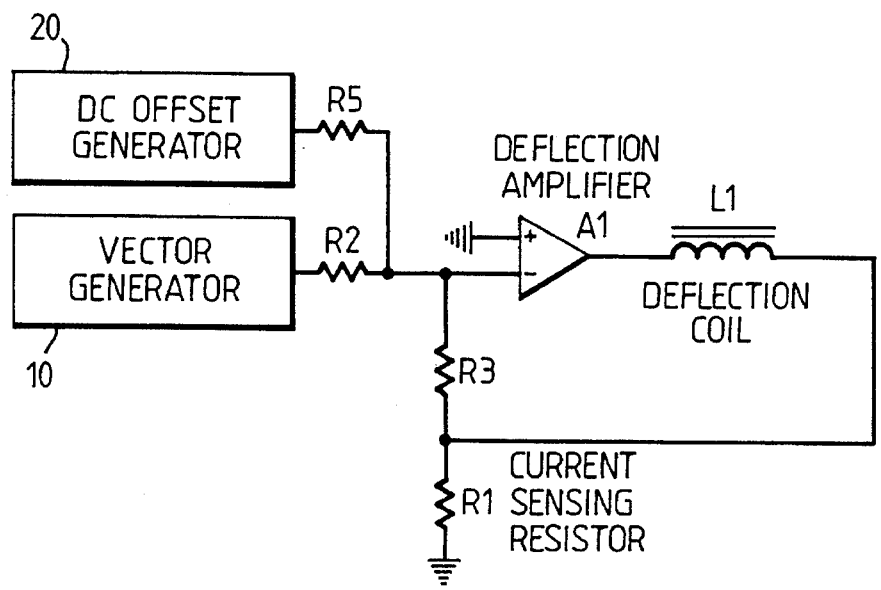
FIG. 1 is a schematic circuit diagram of a known linear deflection system permitting an offset scan.

Referring to FIG. 1, in a known deflection system for use in, for example, telecine machines or calligraphic displays the deflection coil L1 of a cathode ray tube (not shown) is connected to the output of a deflection amplifier A1, connected with current feedback in a transconductance configuration. The other side of the deflection coil L1 is connected to ground via a current sensing resistor R1. The potential at a point between the deflection coil and the current sensing resistor is therefore proportional to the current through the deflection coil L1. This potential is fed back to the inverting input of the deflection amplifier A1 (via a feedback resistor R3). The non-inverting input of the amplifier A1 is earthed.

To employ this deflection system to produce an electron beam scan, a vector generator circuit 10, generating a voltage corresponding to the desired horizontal beam position over time, is coupled to the inverting input of the deflection amplifier A1. For example, for a linear raster scan, the vector generator circuit 10 generates a triangular sawtooth waveform and could comprise, for example, a Miller integrator.

In a telecine machine, a separate control is provided to enable the horizontal position of the scan to be varied; this is achieved by coupling a source of DC voltage 20 to the virtual earth (inverting input) of the amplifier A1. For example, for manual operation the DC offset generator 20 may be a potentiometer connected across the DC power supply rails.

In the absence of a magnetic field from the deflection coil L1, the construction of many cathode ray tubes is such that the electron beam travels in a straight line to the centre of the phosphor screen. The vector generator 10 therefore generally generates a symmetrical waveform scanning the beam from one side of the screen to the other to an equal extent about this centre point (the beam position corresponding to no current through the deflection coil L1). The effect of adding the DC offset from the DC offset generator 20 is thus to shift the scan to one side or the other of the centre point, depending upon the sign of the DC offset voltage.

High precision deflection amplifiers are relatively expensive, because they are required to generate high currents and dissipate substantial heat. Adding the DC offset to the input of the amplifier A1 conveniently avoids the requirement for a separate power amplifier to generate the DC offset current through the deflection coil L1.

However, when the arrangement of FIG. 1 is employed to generate a raster scan, the electron beam is required to fly back to its starting point at the end of each scan across the screen. This requires a rapid reversal of the direction of current flow in the deflection coil L1, but the inductance of the deflection coil resists any such rapid current changes. Accordingly, it is necessary to apply a high voltage across the deflection coil L1 during flyback; the shorter the period available for flyback, the higher the voltage required. Since the flyback period is much smaller than the line scanning period in most video formats, the voltage required to be generated by the deflection amplifier A1 during flyback is many times higher than that required to be generated during the scan, and consequently high power supply voltage rails are required, which is inconvenient; also, the amplifier A1 during the scan period will be operating only over the centre of the available supply voltage range which is inefficient. Thus, in rapid scanning applications the circuit of FIG. 1 is inefficient and dissipates a considerable amount of heat which is undesirable.

Basic resonant flyback circuit

Figure 2:
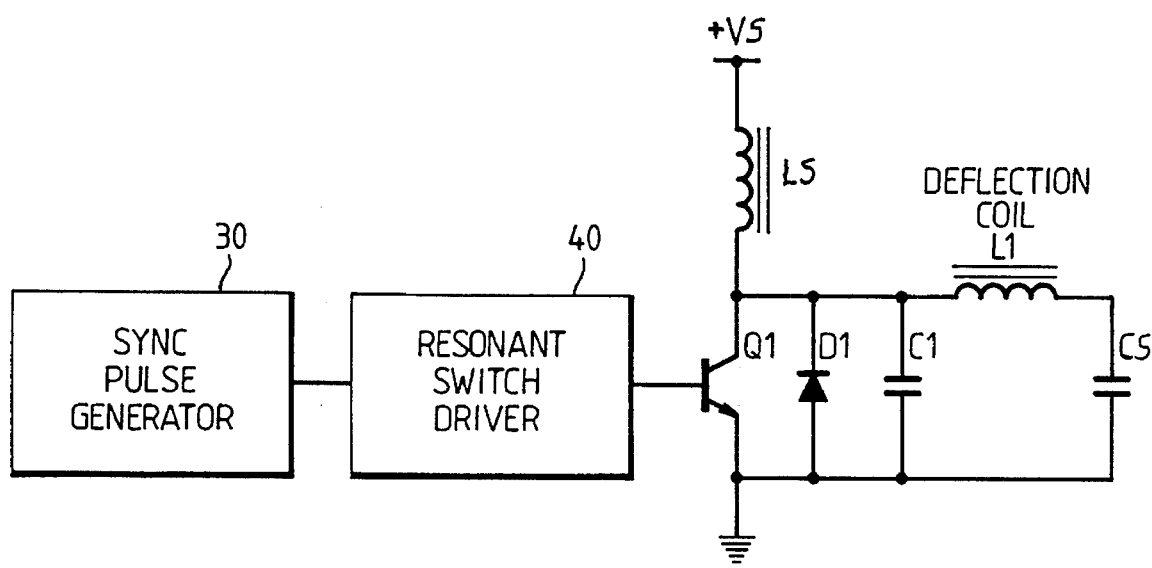
FIG. 2 shows schematically a known deflection system including resonant flyback.

Referring to FIG. 2, in television receivers (which operate in a raster scanning mode without any requirement to vary the position of the scan) the deflection coil L1 is energised from a supply voltage $+V_S$, via a supply choke inductance LS. A power semiconductor switch Q1 connects the other side of the supply choke LS to earth. With Q1 initially switched off, the deflection coil L1 and the supply choke LS act as good conductors, so that there is substantially no voltage drop between the supply voltage $+V_S$ and the capacitor CS, the other side of which is connected to earth. Consequently, CS charges to the supply voltage $+V_S$.

At the end of the line scan period, a sync pulse generator 30 extracts the synchronisation information from the incoming television signal and generates a synchronising pulse to start the flyback. The synchronising pulse is fed to a resonant switch driver circuit 40 (typically a pulse transformer) which switches the transistor Q1 off. After flyback, the transistor Q1 switches on again and hence grounds the supply voltage side of the deflection coil L1. Since the other side of the deflection coil L1 is at the supply voltage $+V_S$ due to the charge stored in the reservoir capacitor CS, current starts to flow through the deflection coil L1 from CS; the current grows approximately linearly through the deflection coil over time, at a rate defined by:

$$di/dt=+V_S/L,$$

where L is the inductance of the deflection coil L1.

The growth of current in the deflection coil therefore progressively deflects the electron beam towards the edge of the screen; when this is reached, the transistor Q1 is switched off. The deflection current continues to flow through L1, but now flows onto a flyback capacitor C1, charging it positively until the current through the deflection coil L1 is zero. The stored energy transferred to C1 from the deflection coil is given by $E=\frac{1}{2} LI^2$. The energy transferred to the capacitor C1 is likewise given by $E=\frac{1}{2} CV^2$, from which the peak voltage across C1 can be derived. There is now a high voltage across the deflection coil L1, due to the capacitor C1 (of the order of several hundred Volts in many applications), and no current is flowing through the deflection coil L1; the electron beam has therefore been returned to the centre of the screen. The flyback capacitor C1 then starts to discharge into the deflection coil L1, starting a rising flow of current in the opposite direction until the capacitor C1 has transferred back all the energy received from the inductor L1. Since the amount of energy discharged into L1 is the same as the amount of energy with which the flyback capacitor C1 was charged by L1, the negative current through L1 at this time is the same as the positive current had been at the end of the forward scan, and the electron beam is consequently returned to a position symmetrically opposite the scan end position, ready for the next cycle. The deflection coil L1 and flyback capacitor C1 are seen to form a resonating circuit, and at this point half the resonant cycle has been completed.

The coil and capacitor would continue to resonate, except that at this point the diode D1 starts to conduct, shorting the capacitor C1. The voltage across the deflection coil L1 is now defined by the charge stored on the reservoir capacitor CS, which is still at the supply voltage $+V_S$, so the current through the deflection coil L1 starts to grow linearly towards zero Amps. Before the current through the inductor reaches zero, the resonant switch driver circuit 40 operates the switch Q1, and the current in the deflection coil can thus continue to ramp positively to complete the forward scan.

A circuit of this type is highly efficient, since energy is transferred back and forth between the deflection coil L1 and the capacitors C1, CS, and the only losses are due to the resistances of the components and voltage drop through the semiconductor components, amounting to 10–20 watts.

However, because of these factors, it is incapable of giving a precisely linear scan and is therefore not employed for high precision applications.

In many applications, the distance between the phosphor screen and the centre of deflection of the electron beam will be much less than the radius of screen curvature and consequently, the linear angular deflection produced by a linearly rising scan current through the deflection coil will not produce a linear trace on the screen; instead, the trace will be stretched towards the edges of the screen. To correct for this, means are provided for reducing the rate of change of scan current towards the edges, by reducing the voltage across the deflection coil.

Conveniently, the value of the reservoir capacitor CS can be chosen such that the small extent to which it is charged and discharged during the linear scan modulates the voltage across it to the desired extent to give the corrected scan. This is known as "S" correction. A value for CS of about 1 uF is typical in television applications. In order that the supply choke LS should present a high impedance to the deflection circuit but supply power maintaining the average voltage across the reservoir capacitor at $+V_S$, an inductance of about ten times that of the deflection coil L1 is employed. However, even with such S correction, non-linearity of on the order of 1% is found and this is unacceptable for higher precision applications.

Known deflection amplifier with resonant flyback

Figure 3:
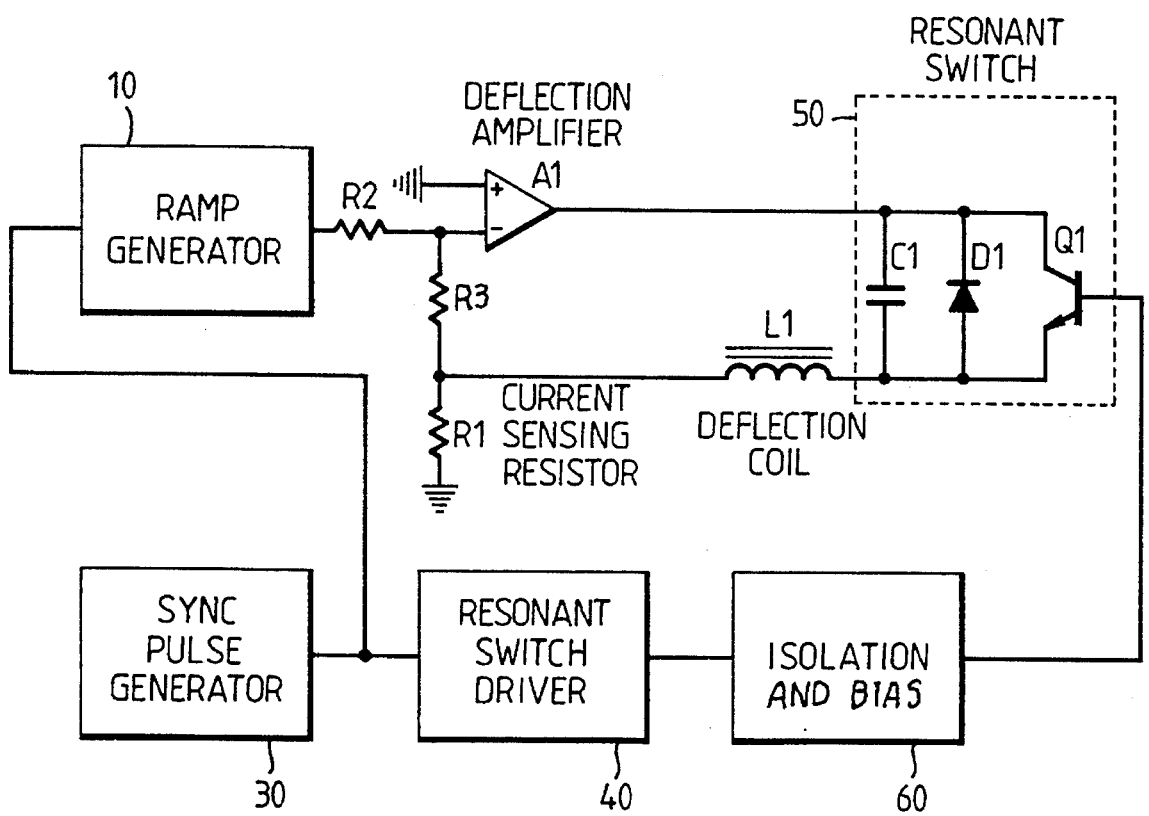
FIG. 3 shows schematically a known deflection system employing a linear deflection amplifier with a resonant flyback circuit.

Referring to FIG. 3, a circuit of the type shown in U.S. Pat. No. 3,914,654 is shown in which the deflection amplifier A1 is interconnected with the deflection coil L1 via a resonant switch circuit 50 which comprises a flyback capacitor C1 having a capacitance selected so that, with the inductance of the deflection coil L1, it forms a resonant circuit with a half period equal to about the flyback period; a diode D1 (as in FIG. 2) in parallel across the flyback capacitor C1 and a switch Q1 in parallel across the capacitor C1 to short the capacitor when switched on.

Thus, when the switch Q1 is closed, this circuit is functionally identical to that of FIG. 1.

The normal operation of this circuit is described extensively in the prior art, and hence will not be dwelt on in detail. A ramp generator 10 provides a sawtooth ramp voltage supplied to the deflection amplifier, which correspondingly produces a sawtooth current output. During the scan period, the switch Q1 is closed and hence as described with reference to FIG. 1 the current through the deflection coil grows from a negative current through zero to a positive current at the end of the line scan. The resonant switch driver 40, through an isolation stage such as a pulse transformer, switches off the transistor Q1. The deflection coil discharges into the flyback capacitor C1, and the same amount of energy is then discharged by the flyback capacitor C1 through the deflection coil L1 in the opposite direction, so that as in FIG. 2 the beam flys back to its starting position. The diode D1 then starts to conduct, stopping the resonant oscillation. Whilst the diode D1 is conducting, but before the current has risen to zero, the resonant switch driver 40 switches the transistor Q1 back on.

During the linear scan, the amplifier A1 needs to provide the DC voltage required across the scan coils itself. The amplifier also needs to be able to provide sufficient voltage to correct for linearity errors due to resistances in the circuit.

In resonant flyback, the recovered energy returned to the inductor L1 for the start of the scan from the capacitor C1 is never quite equal to the energy in the inductor L1 at the end of the previous scan before flyback, and so the beam does not fly back quite far enough. At the start of each scan, therefore, the deflection amplifier swings to its maximum output voltage until the voltage across the current sensing resistor R1 cancels the voltage from the vector generator 10, at which point linear scan begins.

Figure 4:
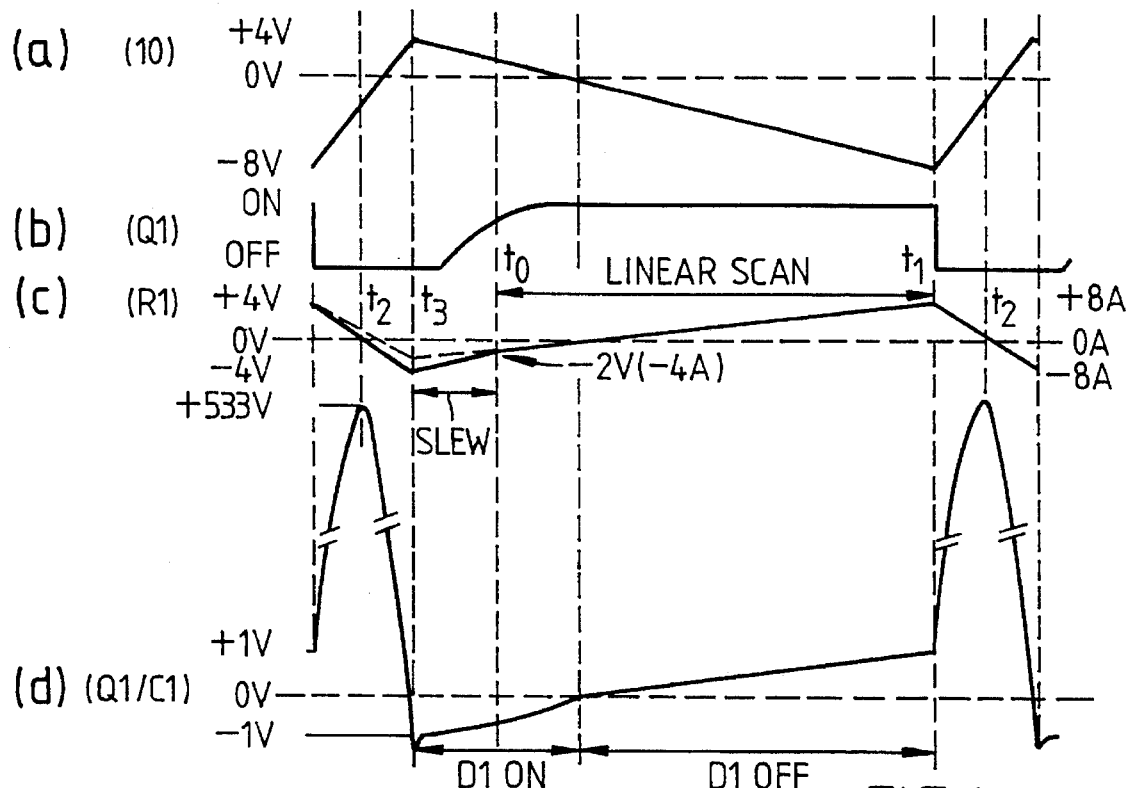
FIG. 4a–d shows schematically the appearance of waveforms at various points in the circuit of FIG. 3 if a notional positive offset current were applied thereto.

S correction can be provided in a system of this type by providing that the ramp generator 10, instead of providing a perfectly triangular sawtooth, generates a signal in which the peaks are modulated by the required S correction voltage.
Effect of applying a shift to known resonant deflection amplifier FIG. 4 shows the waveforms of various points in the circuit of FIG. 3, as follows:

(a)—Sum of the driving voltages supplied to amplifier A1 relative to ground.

(b)—Input driving current at base of switch Q1 relative to ground.

(c)—Current through voltage over sensing resistor R1, relative to the emitter of switch Q1

(d)—Voltage over collector-emitter of switch Q1

Referring to FIG. 4, the reason why it is not possible to add a DC offset generator 20 of the type shown in FIG. 1 to the circuit of FIG. 3 will be explained. If the normal signal produced by the ramp generator 10 is a sawtooth wave running from −6 to +6 Volts, giving rise to a current output of +6 to −6 Amps, the effect of adding a −2 volt DC offset voltage to the input of the amplifier is, as shown in FIG. 4(a), to shift the sawtooth down two Volts. The corresponding desired current waveform would be a sawtooth shifted to run from −4 Amps to +8 Amps.

Over the period between time $t_0$ and $t_1$, the switch Q1 is on, and conducts (whilst Q1 is switching on, the diode D1 is already conductive) and the current through the current sensing resistor (and voltage across the resistor) shown in FIG. 4c follow the voltage ramp produced by the ramp generator 10 (shown in FIG. 4a).

At $t_1$, the forward scan is at an end and the resonant switch driver 40 switches transistor switch Q1 off. The current still flowing from deflection coil L1 starts to charge the capacitor C1, causing the deflection current through the current sensing resistor R1 to fall to zero at time $t_2$, at which time the voltage across the transistor switch Q1 and capacitor C1 is at a maximum. The flyback capacitor C1 then starts to discharge, driving a progressively larger current in the reverse direction through the deflection coil.

The discharging of C1 over the period $t_2-t_3$ is symmetrical over time with the charging over the period $t_1-t_2$, and consequently the reverse deflection current flow through L1 builds up to the same magnitude as the deflection current at the start of flyback. Consequently at $t_3$ the current through the deflection coil L1 is −8 Amps.

The flyback has therefore taken the beam to a position much further away from the centre than the scan starting position, which corresponds to a deflection coil current of −4 Amps. To slew the beam to the desired position, over the period $t_3-t_0$ the amplifier A1 swings to its positive power rail; the lower the supply voltage of the amplifier, the longer the length of the period $t_3-t_0$ over which the beam does not follow the desired ramp.

The position to which the beam flys back is thus seen to be in error by an amount corresponding to a current of magnitude twice the added offset current.

Further, if the magnitude of the offset current is greater than half the magnitude of the sawtooth, so that the deflection current does not fall to zero Amps, the diode D1 would not switch on and the finite rise time of the transistor switch Q1 would permit the circuit to continue resonating into the linear scanning period, further disturbing the linearity of the initial part of the scan.

Figure 5:
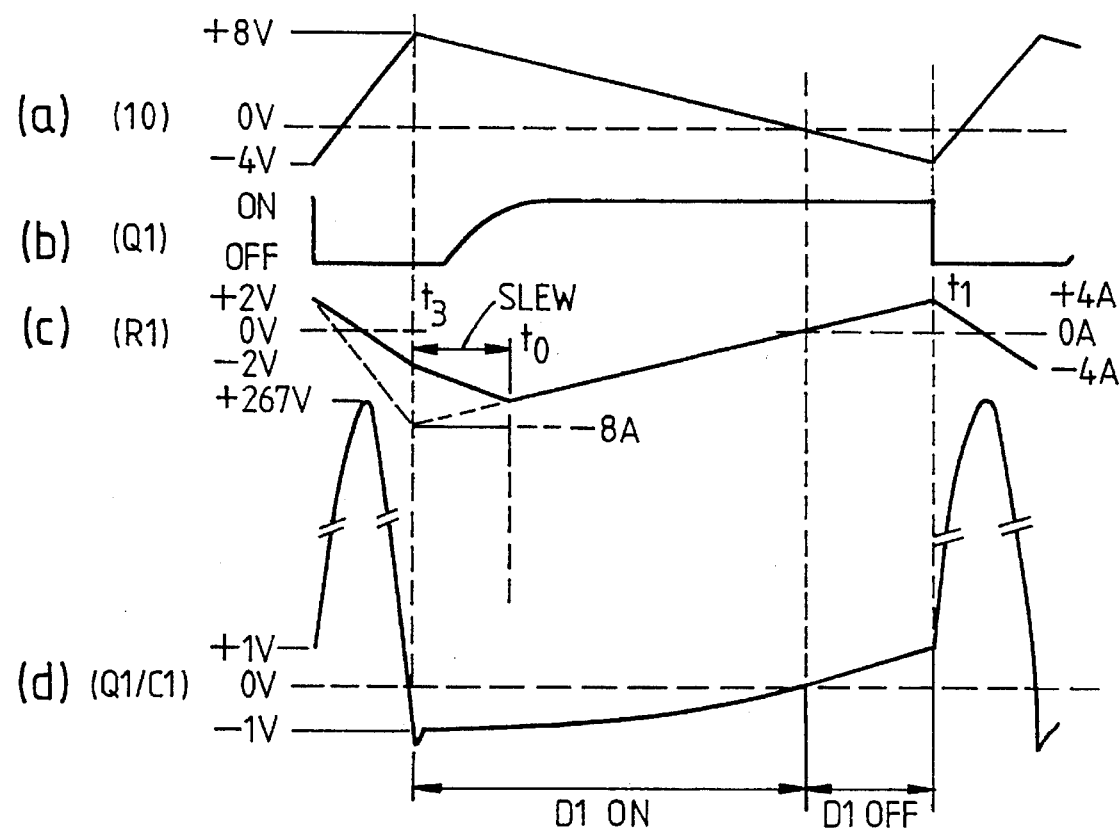
FIG. 5a–d correspondingly shows waveforms if a negative notional offset were applied thereto.

Referring to FIG. 5 (which corresponds to FIG. 4), when an equivalent DC offset giving rise to a negative 2 amp current is added, a similar problem arises. The deflection current at the time $t_1$ when the transistor Q1 switches off is +4 Amps, and the beam therefore flys back to a position corresponding to a deflection current of −4 Amps. However, the required scan position starting point corresponds to a deflection current of −8 Amps, and over the period $t_2$–$t_3$ the deflection amplifier A1 needs to expend substantial time slewing the deflection current towards its desired value of −8 Amps, thus again giving rise to non-linearity in the early part of the scan.

PREFERRED EMBODIMENTS OF THE INVENTION

First Embodiment of the Invention

Figure 6:
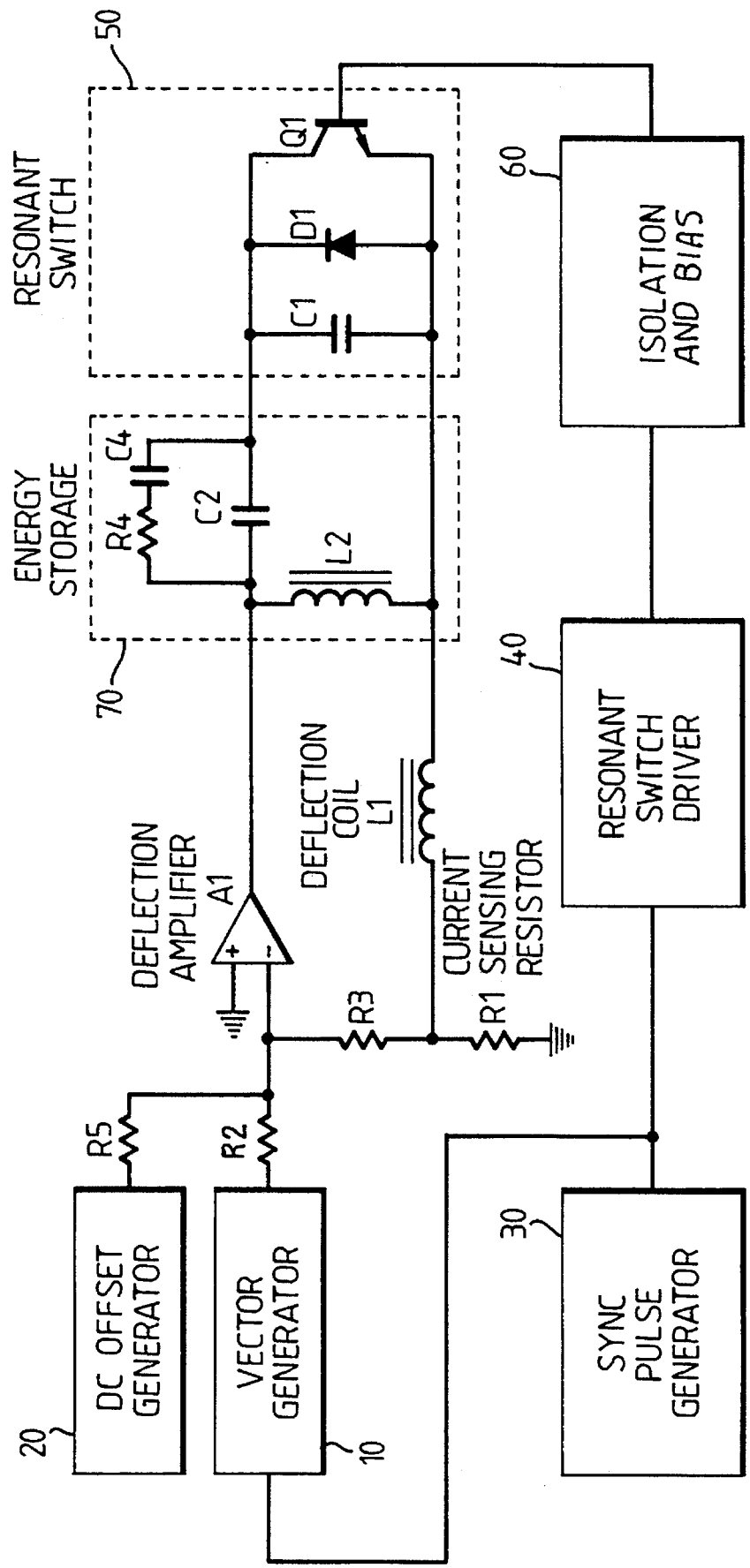
FIG. 6 is a schematic circuit diagram of a first embodiment of the invention being a modification of the circuit illustrated in FIG. 3.

Referring to FIG. 6, in which components already mentioned in the preceding drawings have the same reference numerals, as in FIG. 1 the deflection amplifier receives as input the outputs of a ramp generator 10 and a DC offset generator 20. The ramp generator 10 is triggered from a sync pulse generator 30 driven at the desired scan line rate. The sync pulse generator 30 also triggers a resonant switch driver circuit 40, which in this embodiment comprises a monostable multivibrator providing a pulse of length longer than the flyback period (preferably only just longer) but shorter than the flyback period plus half the line scan period, triggered from the rising edge of the line blanking sync pulse from the sync pulse generator 30. The pulse is fed, via a pulse transformer 60, to the base of the transistor Q1 so as to turn the transistor Q1 off at the end of the linear scan, and on again just after the end of the flyback period, just as described above.

A circuit 70 for shifting the flyback is provided, comprising an energy storage inductor L2, and a DC blocking capacitor C2. The inductor L2 provides a DC/low frequency path for the scan current from the amplifier A1 to the deflection coil L1 and current sensing resistor R1. The capacitor C2 forms a DC block and an AC path, so that all of the offset current due to the DC offset generator 20 flows through the inductor L2 (substantially without voltage drop). The inductor L2 therefore needs to be rated to carry several Amps. The inductance of L2 is selected to be greater than that of the deflection coil L1, so that the inductor L2 exhibits high impedance at the raster scanning frequency of the ramp generator 10; a typical value for the inductance of L2 may be about ten times that of the deflection coil L1.

The sawtooth current due to the ramp generator 10 therefore passes through the capacitor C2 which is a relatively large, for example, film capacitor of the order of 10 uF.

Optionally, a damping path R4/C4 may be provided. The damping path comprising resistor R4 and capacitor C4 (typical values 3.9 ohms (2.5 W) and 100 uF, electrolytic) damps the resonant circuit produced by the parallel combination of C2 and L2, to allow the deflection system to be used in a vector (rather than raster) mode as discussed below.

When the switch Q1 is closed, the effect of the parallel combination of C2 and L2 is merely a small voltage drop. The circuit of FIG. 6 therefore operates like that of FIG. 3 during the linear scan of the beam.

At the end of the linear scan if (as above described with reference to FIG. 4) an offset current of +2 Amps is flowing, this continues to flow through the inductor L2. Thus, as current flows from the deflection coil L1, at an initial rate of 8 Amps, the current charging the flyback capacitor C1 is reduced by 2 Amps since this current is diverted through the inductor L2. The initial current charging the capacitor is thus only 6 Amps. When the current from the deflection coil L1 falls to 2 Amps, the flyback capacitor C1 stops charging altogether since all current is diverted through the inductor L2, and starts discharging to L2 and L1. When the discharging current from the flyback capacitor C1 exceeds 2 Amps, the remaining current discharges through the deflection coil L1 and reverses the direction of current flow.

It will thus be seen that the inductor L2 acts as a substantially constant current path during flyback, drawing a current equivalent to the DC offset applied to the scan so as firstly to subtract that offset from the current charging the capacitor and secondly to subtract the offset current from the current discharging from the flyback capacitor through the scan coil L1. The beam is returned to close to its starting position, leaving the amplifier A1 only a short distance to slew the beam.

Considering both L1 and L2 to be lossless inductors, the average DC voltage across each during a complete raster and flyback cycle under steady state conditions is 0. The volt-second product across each during the forward scan must therefore be exactly cancelled by the volt-second product during the flyback.

In resonant flyback, a large negative voltage is developed across the scan coil for the short durations of the flyback period, and this must therefore be balanced during the much longer forward scanning period by a much smaller positive voltage.

Since the switch Q1 and diode D1 both have very low voltage drops when conducting, during the linear scan, substantially the forward scan voltage (defined by V=Ldi/dt, where L is the inductance of the deflection coil) is developed across the capacitor C2 which thus acts to some extent as a reservoir capacitor CS in FIG. 2. Since the capacitor C2 rather than the amplifier A1 is providing the voltage supply for the deflection coil, this increases the efficiency of the deflection amplifier A1 by allowing it to operate on lower supply voltages.

Second Embodiment of the Invention

Figure 7:
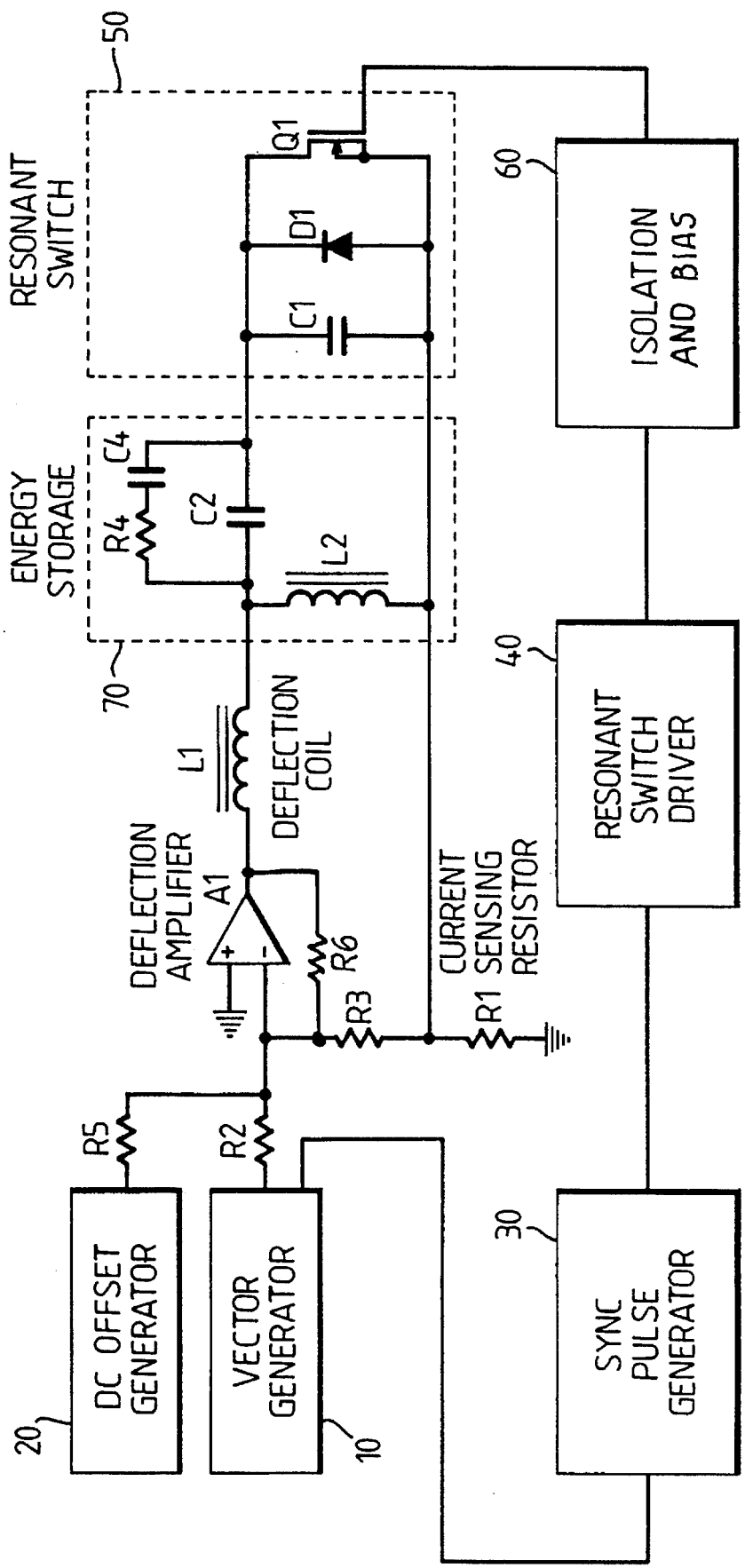
FIG. 7 is a schematic diagram of a second embodiment of the invention.

Referring to FIG. 7, in the second embodiment the deflection coil L1 is positioned between the deflection amplifier and the switch Q1. The high voltage pulses across the deflection coil thus do not reach the source terminal of the switch Q1. Rather than employing a bipolar transistor for the switch Q1, as in the previously described circuits, a power MOSFET is employed. The bipolar transistor requires a large base current to provide saturation during the scanning operation. However, it is highly desirable to isolate the drive to the control terminal of the switch Q1 in order to avoid possible shunting of the current sensing resistor R1.

Further, where (as discussed below) the amplifier is to be used in a vector (i.e. non-scanning) mode, in which the switch is constantly closed it is difficult to provide a substantial base current whilst isolating a bipolar transistor, and the base current is a substantial extra power loss. On the other hand, a power MOSFET requires only a bias voltage of 10–20 Volts which can be obtained from the positive supply rail via a high impedance resistive network, for example. The power MOSFET Q1 is held in the ON state by the bias voltage until the start of resonant flyback, when it is rapidly turned off by discharging the gate-source capacitance.

The damping path R4/C4 may be omitted as discussed in relation to FIG. 16 below.

A feedback voltage loop may be provided by connecting a feedback resistor R6 between the inverting input of A1 and its output.

Figure 8:
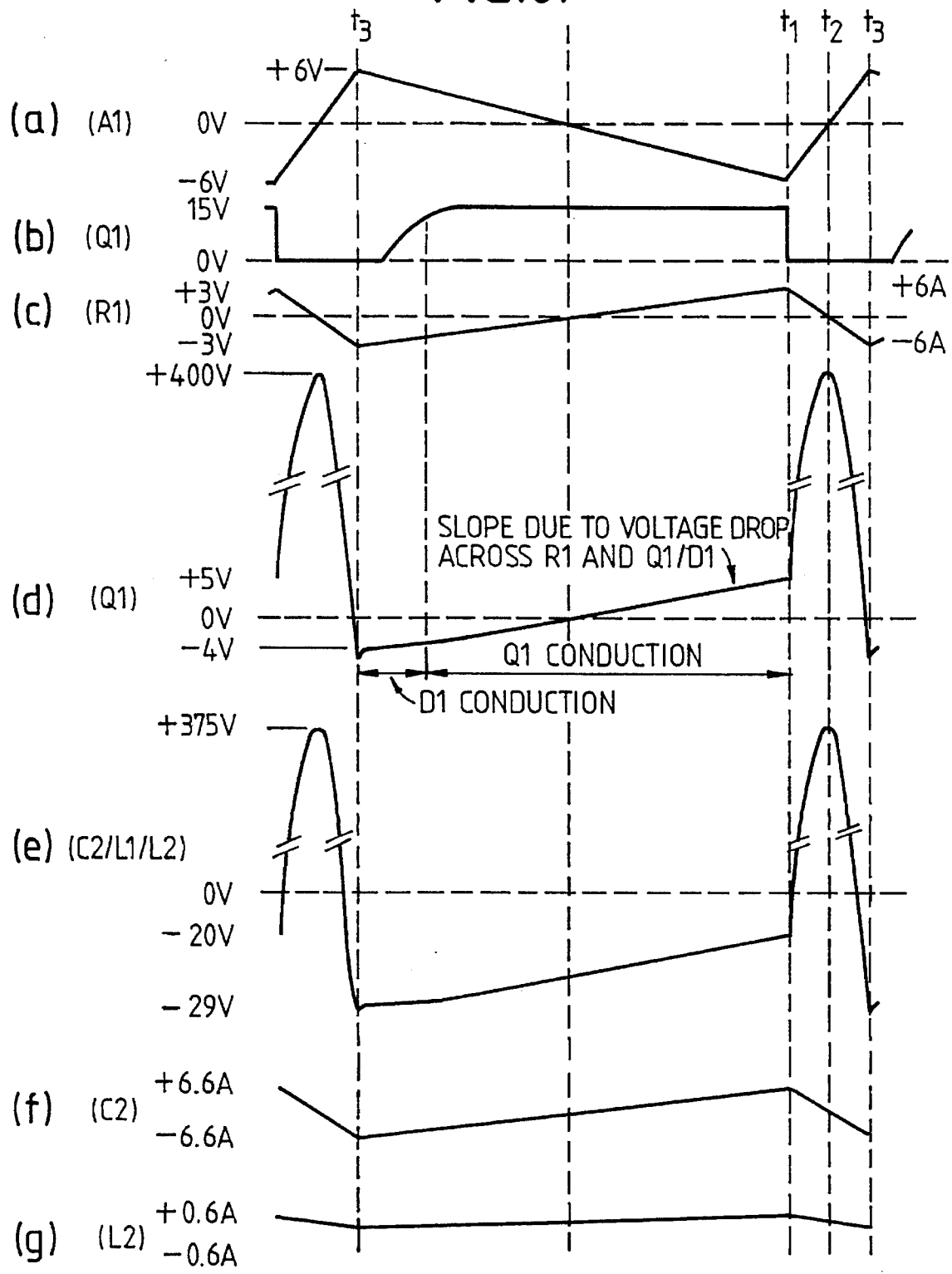
FIG. 8a–g shows schematically the appearance of waveforms at various points in the circuit of FIG. 7 with no shift applied thereto.
Figure 9:
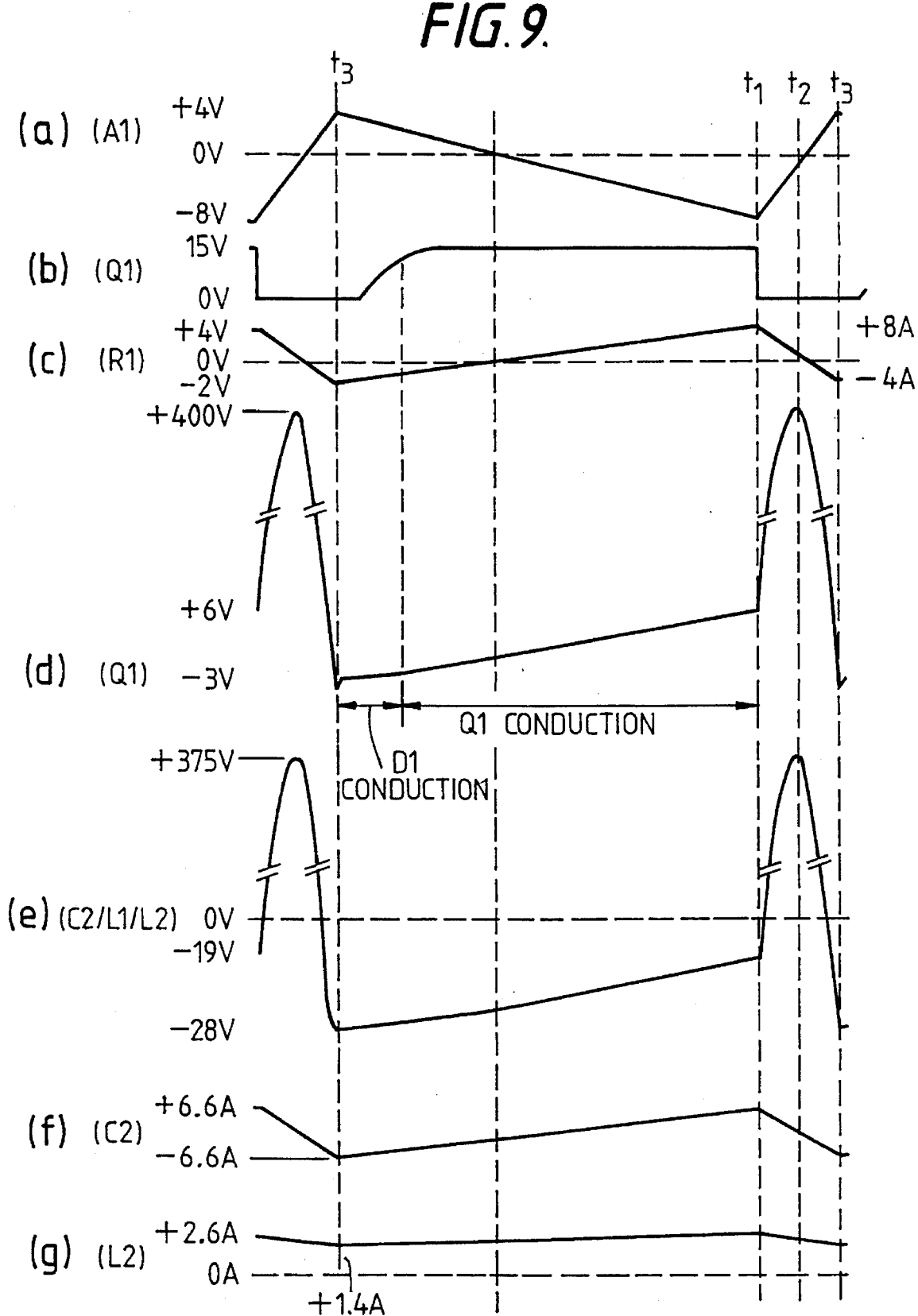
FIG. 9a–g shows schematically the corresponding waveforms with a positive applied offset corresponding to FIG. 4.
Figure 10:
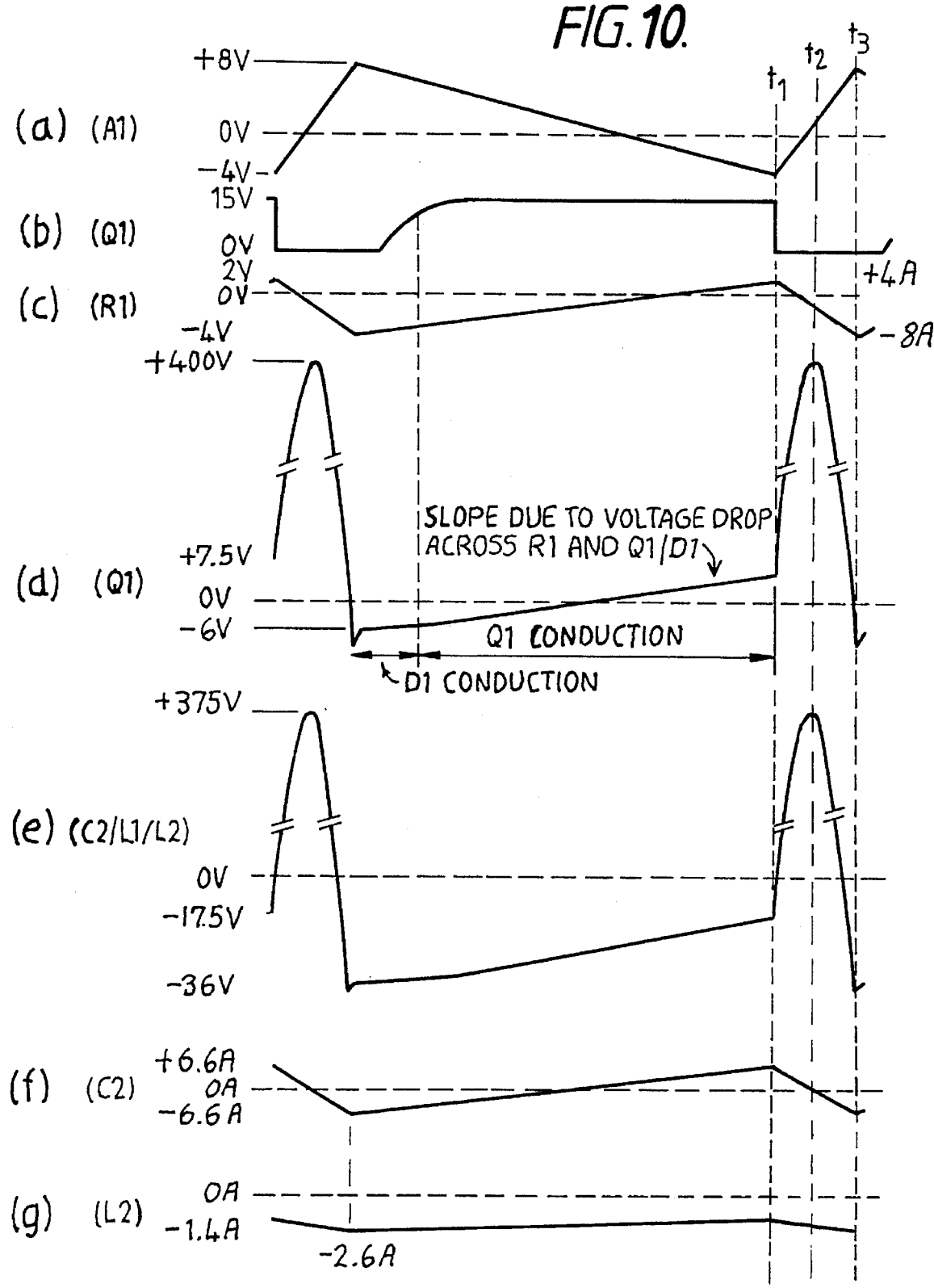
FIG. 10a–g shows schematically the corresponding waveforms with a negative applied shift corresponding to FIG. 5.

FIGS. 8–10 show the signal at various points in the circuit of FIG. 7, and in particular:

(a)—Sum of the driving voltage signals to amplifier A1 relative to ground;

(b)—Gate-source voltage on transistor Q1;

(c)—Current through and voltage across current sensing resistor R1 relative to ground;

(d)—Voltage at drain of transistor Q1 relative to ground;

(e)—Voltage at junction of C2, L1, L2 relative to ground;

(f)—Current through C2;

(g)—Current through L2.

Referring to FIG. 8, the behaviour of this embodiment when no DC offset is applied by the DC offset generator 20 is shown.

The current through the inductor L2, shown in FIG. 8g, averages zero Amps with a fluctuation on the order of ±0.6 Amps. The corresponding current through the capacitor C2 is the sum of the AC deflection current generated in response to the scan generator 10, and the AC ripple current through L2, i.e. from −6.6 Amps to +6.6 Amps during the linear scan period to $t_1$. At this time, as before, the switch Q1 is opened. The current from the deflection coil L1 continues to flow through the capacitor C2, as shown in FIG. 8e, which charges the flyback capacitor C1 as shown in FIG. 8d.

At time $t_2$, the deflection current has reached zero Amps and the flyback capacitor C1 then starts to discharge, flowing through C2 in the opposite sense and causing a current flow in the reverse direction in the deflection coil L1 until the diode D1 starts to conduct at $t_3$. The operation of the circuit with no offset is therefore equivalent to that of the circuit of FIG. 3.

Referring to FIG. 9, when a +2 Amp DC offset current is applied (as in FIG. 4), as shown in FIG. 8g, the current through the inductor L2 averages +2 Amps (fluctuating between +2.6 and +1.4 Amps). As in FIG. 8, the current through the capacitor C2 swings between +6.6 and −6.6 Amps. At time $t_1$, when the transistor Q1 switches off, the current flowing through the deflection coil L1 is +8 Amps. 2.6 Amps continues to flow down through the inductor L2, and the remaining 5.4 Amps current passes through the capacitor C2, and charges the capacitor C1, as shown in FIG. 9d. At time $t_2$, the current from the deflection coil has dropped to 2 Amps, the sum of this and the 2 Amp current flowing out through the inductor L1 is therefore zero and so the capacitor C1 stops charging, and starts to discharge.

At the centre of the flyback pulse, the deflection current is therefore equal to 2 Amps which is the desired offset current. The subsequent discharging of the capacitor C1 to L2 and L1 further reduces the deflection current to zero when the current from C1 has risen to 2 Amps, and then thereafter generates a growing reversed deflection current rising to −4 Amps when the discharging current from C1 has risen to 6 Amps (the remaining 2 Amps continuing flow through L2). This current corresponds to the desired beam position for the start at the next line scan. At this point, the voltage over C1 has fallen to the point at which diode D1 conducts, and the flyback ends.

Thus, the peak current charging the capacitor C1 was approximately 6A, and the peak discharging current from C1 is likewise approximately 6A, but because of the current drawn through the inductor L2, the deflection current through the deflection coil L1 at the end of the flyback period is −4 Amps, which is the correct starting current for the next scan.

If the inductance of L2 were sufficiently high, the magnitude of the AC ripple in the current through L2 would fall towards zero, and the current through L2 would correspond exactly to the constant deflection current due to the DC offset generator 10. In fact, however, this is undesirable where (as in a telecine machine) it is desired to interactively change the scan offset since the high inductance of L2 would oppose the change, and hence a value for L2 is chosen so as to permit the scan to be shifted within a single frame, or a few frames. Large inductances also require bulky and expensive coils.

In fact, the presence of a substantial ripple in the current through L2 does not affect the operation of the shift circuit, as since the ripple is symmetrical during the flyback pulse the average current still corresponds to the required offset current.

However, if the inductance of L2 is too low (for example, equal to that of L1), so that the ripple is on the order of the AC scan current, the magnitude of the ripple current through C2 is correspondingly undesirably increased, leading to higher peak voltages at the switch Q1. The value of L2=10 L1 described above is acceptable, although ratios as low as 5 could be employed.

It will be noted that in this case, as in FIG. 7, the maximum voltage at the drain of Q1 is held at 400 Volts as shown in FIG. 7d, rather than varying with the offset applied. This enables the use of a transistor switch Q1 with a relatively lower voltage rating.

Referring to FIG. 10, the effects of a negative offset current of −2 Amps are illustrated. In this case, referring to FIG. 10g, the current through the inductor L2 is approximately −2 Amps (−1.4 Amps to −2.6 Amps). This current flow therefore assists in charging the flyback capacitor C1, and subsequently is additive to the current discharged from the flyback capacitor C1 through the deflection coil L1 so that the total deflection current at the end of the flyback period is −8 Amps, which is the correct starting position for the next scan.

Third Embodiment of the Invention

In the circuit shown in FIG. 7, it will be seen that a feedback voltage may be taken from the output of the deflection amplifier A1, and fixed with the current feedback signal from the current sensing resistor R1 in order to reduce the output impedence of the amplifier A1, and to produce critical damping of the deflection coil L1. The voltage feedback signal is the sum of the voltage drops across L1, and the energy storage circuit 70. It is found, however, that a problem arises in the use of this deflection circuit, in that the voltage across the energy storage circuit 70 increases in raster mode. This generates an error which causes poor raster linearity and an unintentional DC shift.

Figure 11:
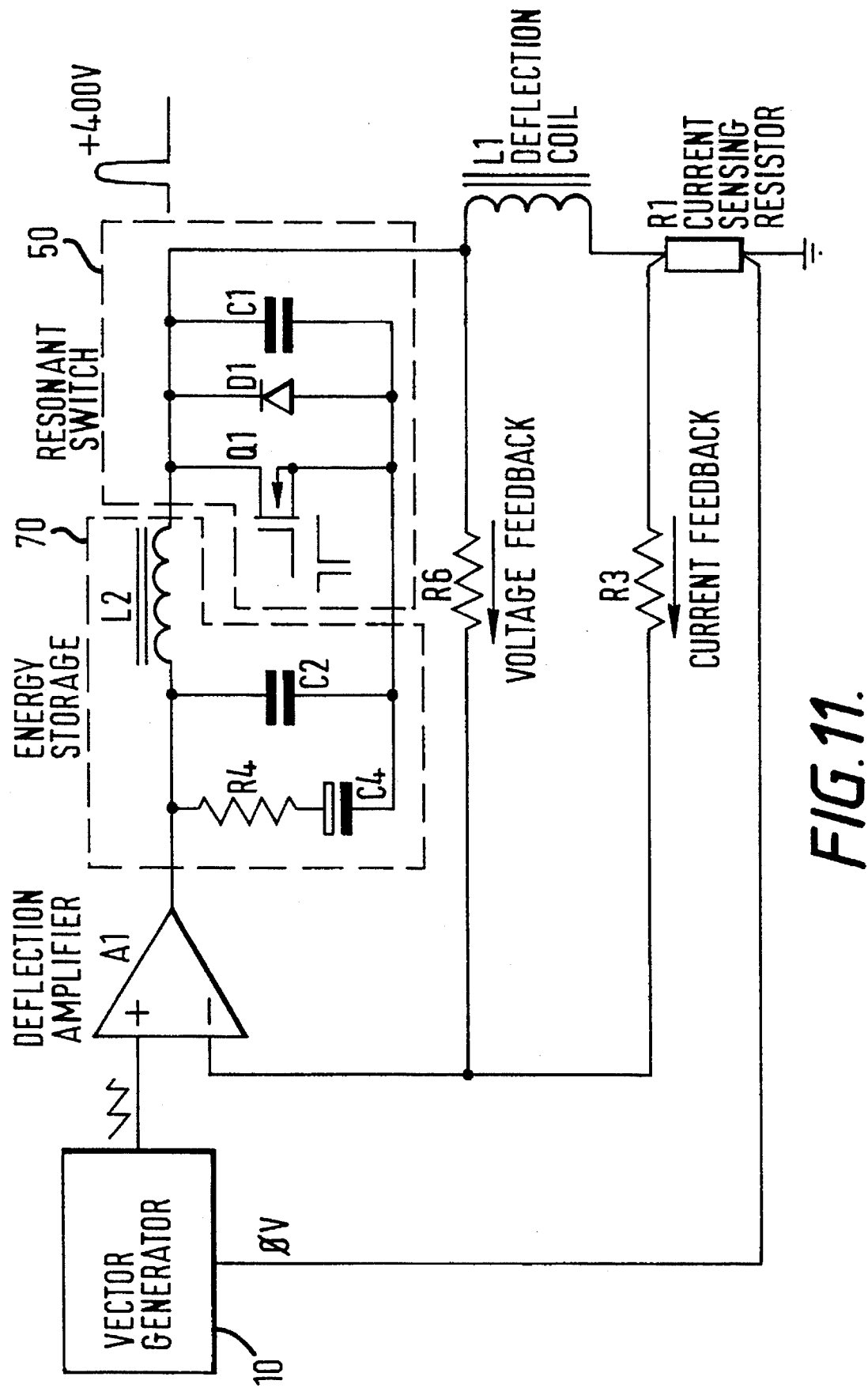
FIG. 11 is a schematic circuit diagram of a third embodiment of the invention, being a modification of the embodiment illustrated in FIG. 7.

Referring now also to FIG. 11, this Figure illustrates a rearrangement of the circuit of FIG. 7 that the end of the deflection coil L1 remote from the output of the deflection amplifier A1 is connected directly to the current sensing resistor R1. The voltage feedback signal is taken via the feedback resistor R6 from the other end of the coil L1, i.e. the end of the coil closer to the output of the deflection amplifier A1. This voltage feedback signal is therefore not affected by the voltage drop across the energy storage circuit 70, since this is now within the feedback loop. It will be seen that in this rearranged circuit the deflection amplifier A1 must be configured as a non-inverting amplifier in order to ensure that the resonant switch 50 is presented with a ramp voltage of the correct polarity.

Fourth Embodiment of the Invention

It is known (for example from GB 2,072,983 and EP 0,115,682) to provide, in a circuit of the type shown in FIG. 2, a pair of flyback capacitors 1 at either side of the deflection coil L1. For the same voltage on each flyback capacitor, and hence on the transistor switch associated therewith, the flyback time can be halved.

Figure 12:
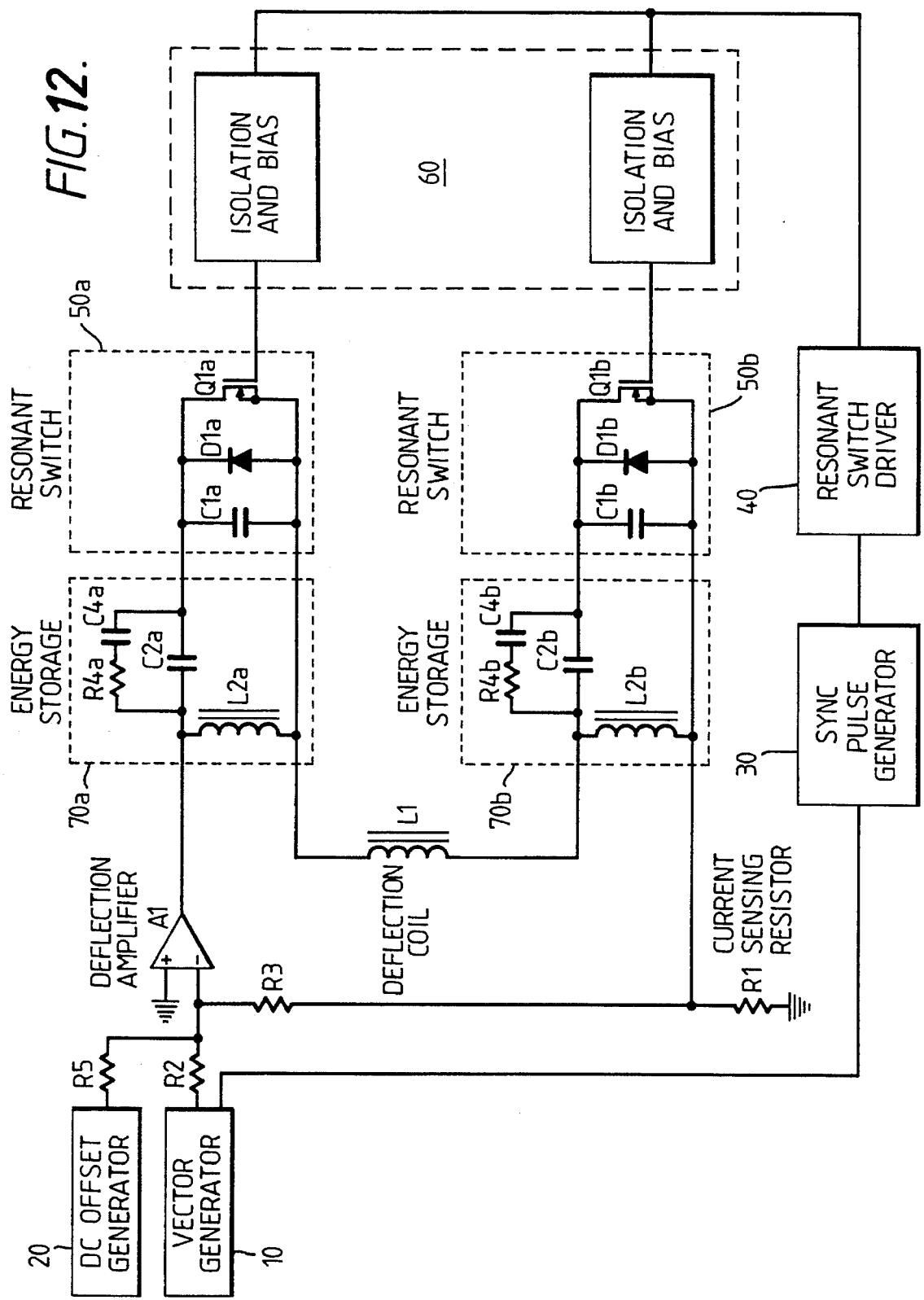
FIG. 12 shows schematically the structure of a fourth embodiment of the invention.

Referring to FIG. 12, in an embodiment of the invention this principle is adopted; in this case, a separate offsetting circuit 70a,70b is provided associated with each resonant capacitor circuit 50a,50b.

Figure 13:
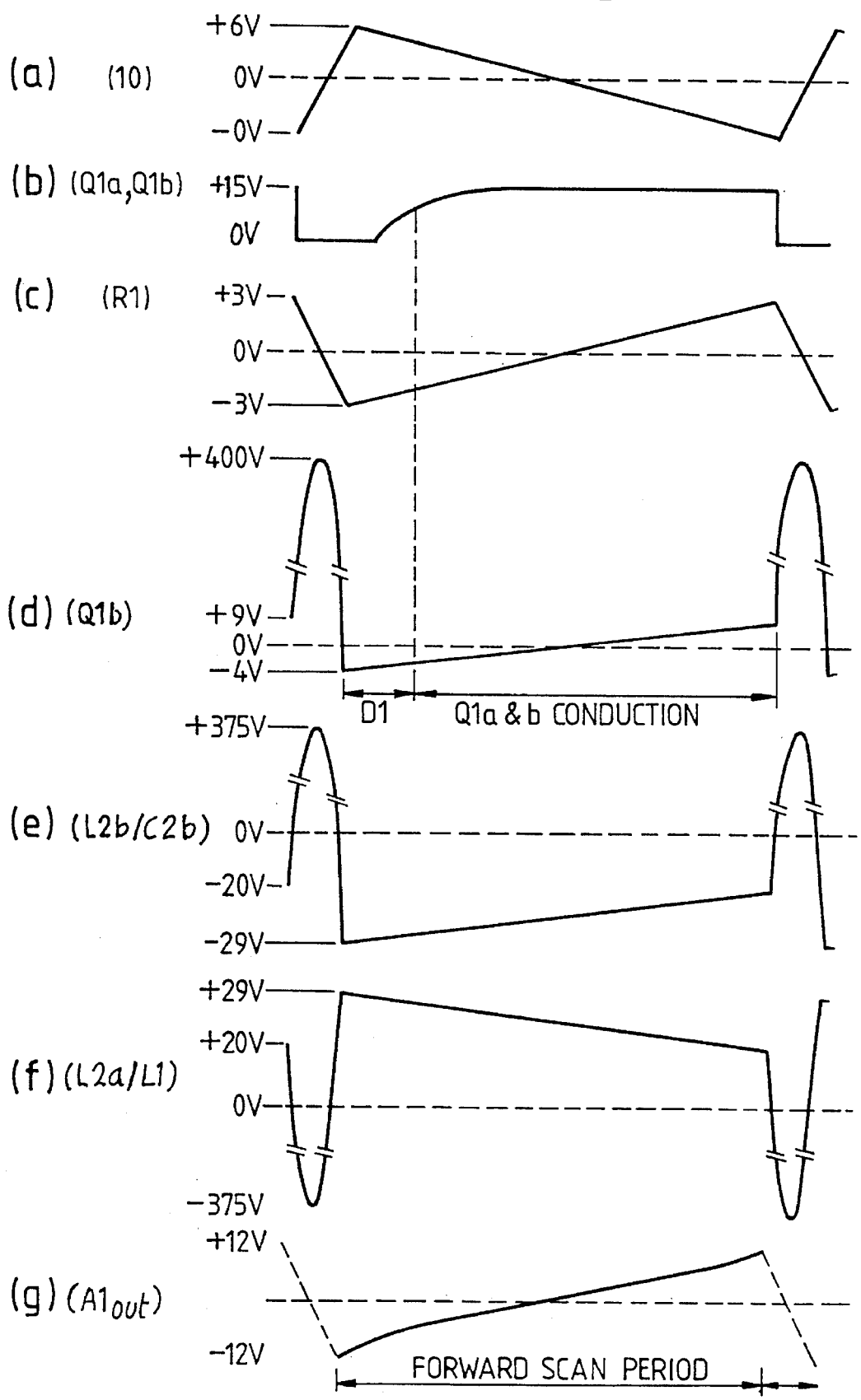
FIG. 13a–g shows schematically the waveforms at various points in the circuit of FIG. 12 with no applied DC offset.

FIG. 13 shows the waveforms at various points in the circuit of FIG. 12, and in particular:

(a) is the input to the amplifier A1;

(b) is the gate-source voltage of the transistors Q1a, Q1b;

(c) is the voltage across the current sensing resistor R1;

(d) is the voltage at the drain of transistor Q1b;

(e) is the voltage at the junction of L2b and C2b;

(f) is the voltage at the junction L2a, L1 (at the source of Q1a);

(g) is the voltage of the output of the amplifier A1 (that at the drain of Q1a is similar but shifted +25 V).

During the forward scan, each of the transistor switches Q1a,Q1b of the resonant circuits 50a,50b is held on as before, as shown in FIG. 13b. Where, as shown in FIG. 13a, no offset current is applied the pulses developed across the flyback capacitors C1a,C1b are, as shown in FIG. 11e and f, symmetrical and of equal and opposite magnitudes, and the deflection current (and hence beam position), as shown in FIG. 13c, flys back to a value of equal and opposite magnitude, as in FIG. 7.

In this case, as shown, the magnitude of each of the positive and negative flyback pulses is the same as in FIGS. 7–9, and the flyback time is substantially halved, thus allowing higher raster scanning speeds.

If a deflection offset current is present, it will flow through a first inductor L2a, then the deflection coil L1 and then the second inductor L2b. The energy for the forward scan is supplied from the capacitors C2a and C2b in series while the switches Q1a and Q1b are closed, and as shown in FIG. 11g, the voltage output of the deflection amplifier A1 can be maintained within ±12 Volts allowing the system to operate from low voltage power supplies.

Preferably, the two inductances L2a,L2b are wound on the same core, thus reducing radiated interference from the deflection coil wiring, and partially equalising the voltage stresses on the transistor switches Q1a and Q1b.

Operation of the circuits with offset current present is substantially as described above with reference to FIG. 7, each of the circuits 70a,70b making a similar contribution.

S Correction

The voltage across the capacitor C2 in FIGS. 6,7 and 11, or C2a and C2b in FIG. 12, does not remain constant but has a parabolic line rate ripple superimposed upon it. At the start of the scan, the deflection coil current is negative but decreasing and thus charges C2 positively until the deflection current falls to zero. C2 then provides the voltage source to allow the scan coil current to increase positively to the end of the scan, partially discharging in the process.

By choosing the correct value for C2, some of the modification of the voltage required for S correction can be provided by the parabolic ripple on the capacitor C2. The vector generator 10 supplies a waveform which is not a perfect sawtooth, but is modified to provide for the S correction required; since the capacitor C2 already provides some of the S correction voltage required, the amount of voltage swing to be supplied by the amplifier A1 to achieve S correction is much reduced.

Telecine machine

Figure 14:
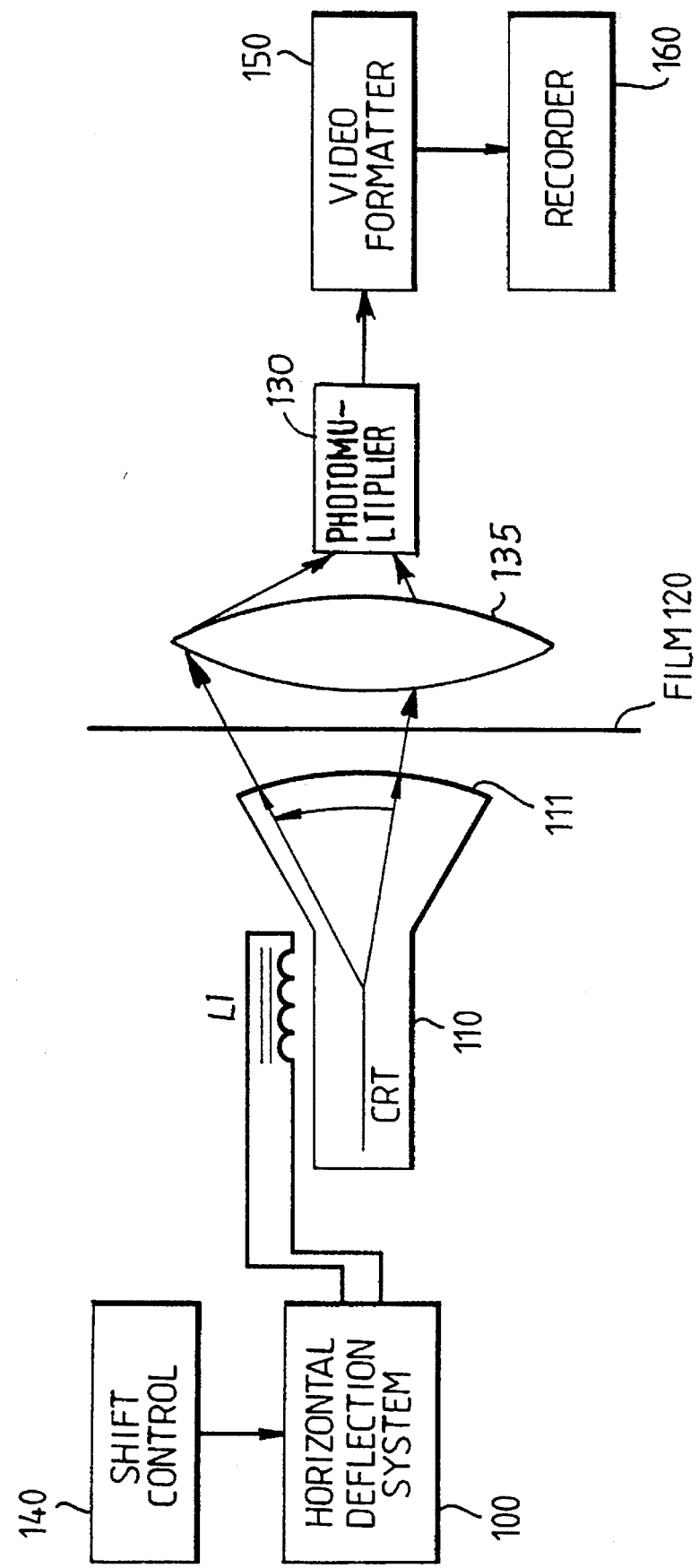
FIG. 14 shows schematically a telecine machine incorporating an embodiment of the invention.

Referring to FIG. 14, in a telecine machine according to the invention, a deflection system 100 comprising, for example, a circuit shown in FIGS. 6, 7,11 or 12, is connected to drive the horizontal deflection coil L1 associated with a cathode ray tube 110 which includes a low persistence phosphor screen 111. A vertical deflection system (not shown) of conventional type is also provided. A film transparency 120 to be scanned is positioned in front of the face plate 111 of the cathode ray tube 110, and on the other side of the film 120 is a photomultiplier pickup 130 to which the light is directed via a converging lens 135. Associated with the horizontal deflection system 110 is a shift control 140 comprising, for example, a joystick manually operable to vary a potentiometer comprising the DC offset generator 20 within the horizontal deflection system 100. An operator can therefore vary the position on the screen 111 and consequently on the film 120 of the raster scan. The output of the photomultiplier 130 is provided with horizontal and vertical synchronising pulses or other video format information as necessary by video formatter 150 and supplied for recording, if desired, on a recorder 160.

In this application, and other applications where the deflection amplifier A1 is required only to provide a raster scan, the power dissipated by the deflection amplifier A1 is much reduced since, firstly, the capacitor C2 supplies the voltage required by the deflection coil during forward scan, and, secondly, because the capacitor C2 provides some of the S correction required, thus reducing the voltage swing required for this purpose from the amplifier A1; the amplifier A1 in preferred embodiments therefore need only correct for resistive losses during the forward scan and can therefore be operated from low voltage supplies.

Multimode Deflection System

In other applications, such as flight simulators, it is desirable to operate a deflection system either in a raster scanning mode or in a vector or calligraphic mode in which the beam position is moved directly between two desired points. Commonly, a frame is created in raster scanning mode and the frame blanking period is then utilised as a period in which a vector mode display, overlaying the raster image, is created, so that the circuit is switched between modes within each frame period at or near the start and finish of each frame blanking pulse.

Deflection systems in the above described embodiments may be used in the latter mode by maintaining the switches Q1 (or Q1a,Q1b) on, so as to provide a path shorting the resonant circuit 70, rather than switching at a line scan frequency. To prevent the capacitor C2 and inductor L2 from unwanted resonance, the damping path R4,C4 is provided; in applications which perform only raster scanning, as described above, the damping path may not be necessary.

Where the embodiment of FIG. 12 is employed, it may additionally be advantageous to provide that the capacitors C2a and C2b have different values, so that the resonant frequencies of the two circuits 70a,70b do not coincide thus reducing further the required output compliance of the amplifier A1.

Where the circuit shown in FIG. 12 is operated in vector or calligraphic mode, as stated above, the effect of the combination of L2 and C2 is usually only to provide a small voltage drop in the circuit. However, the combination of L2 and C2 provides a resonant circuit with a resonance at around 1 kHz. The damping path R4, C4 described above acts to reduce the ringing of this circuit in normal use. However, if the vector generator 10 were to provide a trace signal with components at this resonant frequency, the damping path in the above described embodiments has an insignificant effect and the energy storage components L2, C2 will build up a large magnitude resonance which could potentially damage the components.

Thus, it is advantageous to provide a bypass circuit for switchably bypassing part or all of the energy storage circuit 70. The bypass circuit is provided to be switched in when the vector circuit operation mode is selected.

It, would be possible to merely provide a short circuit path across the inductor L2 or capacitor C2. However, the former is undesirable because it would require high voltage switch components. The latter is undesirable, because during the resonant raster scanning mode the capacitor C2 in the above embodiments will build up a DC voltage of 25–30 volts, and this voltage will dissipate if the capacitor C2 is left inserted. If the circuit is thereafter switched back into resonant raster scanning mode, it will take a number of scanning line periods for the charge on the capacitor C2 to build up again, and during this period either high voltages will be required from the deflection amplifier A1 or the line scans will be distorted. Furthermore, discharging the capacitor C2 by a sudden short circuit could result in component damage.

Accordingly, it is particularly preferred that the bypass circuit should isolate the capacitor C2, and thus maintain the charge on the capacitor whilst the circuit is in vector mode.

Fifth Embodiment of the Invention

Figure 15:
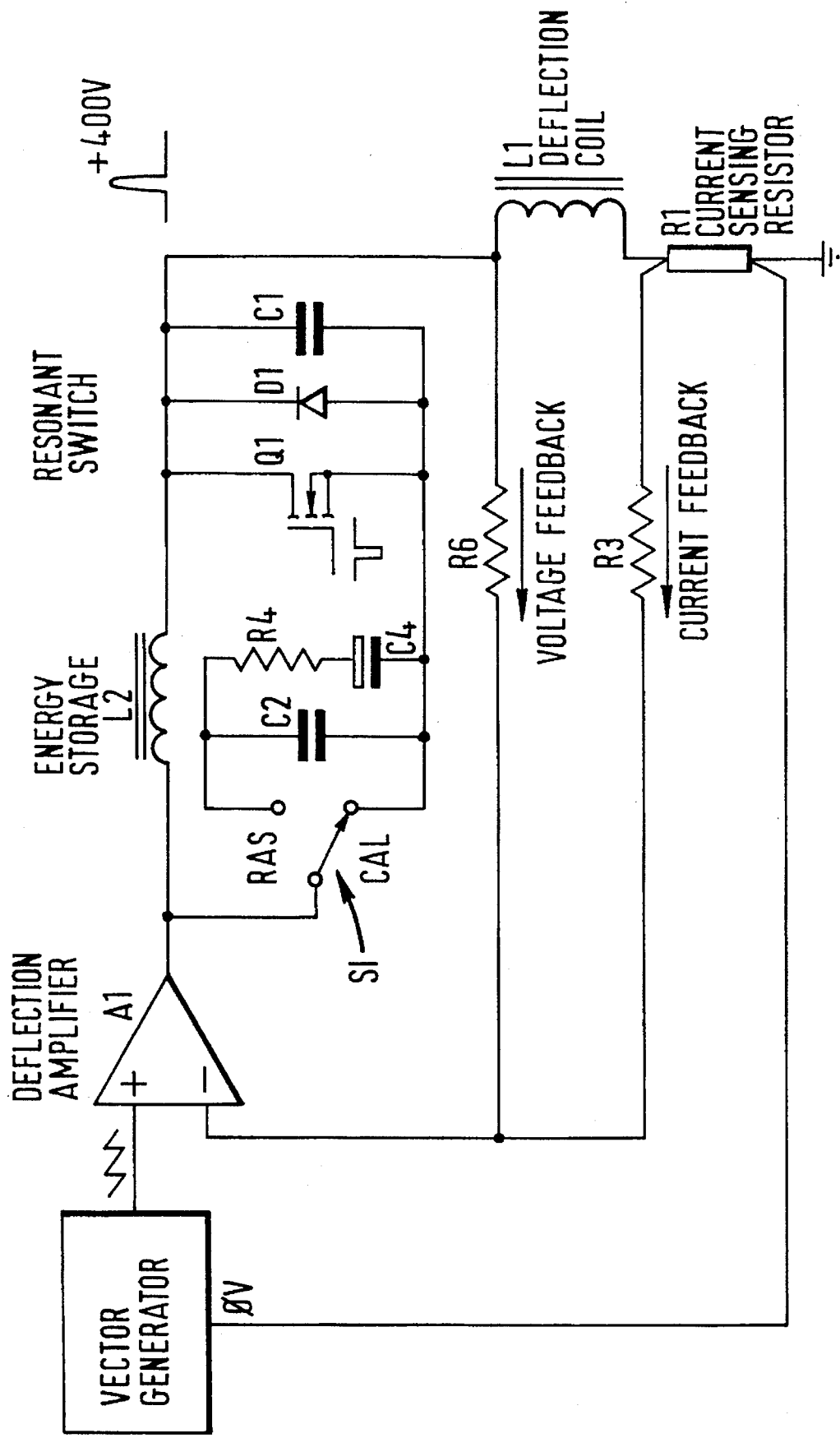
FIG. 15 is a schematic circuit diagram of a fifth embodiment of the invention, being a modification of the embodiment illustrated in FIG. 11.

Referring now to FIG. 15, this Figure illustrates the addition of a switch S1 to the circuit shown in FIG. 12, the resonant switch driver circuit being omitted in FIG. 15 for the sake of clarity. The switch S1 allows the energy storage circuit 70 to be bypassed during calligraphic operation of the deflection system. The use of such a switch S1 avoids problems with spurious resonances in the components of the energy storage circuit 70, whilst still allowing C2 to retain its charge ready for the next raster field.

Sixth Embodiment of the Invention

Figure 16:
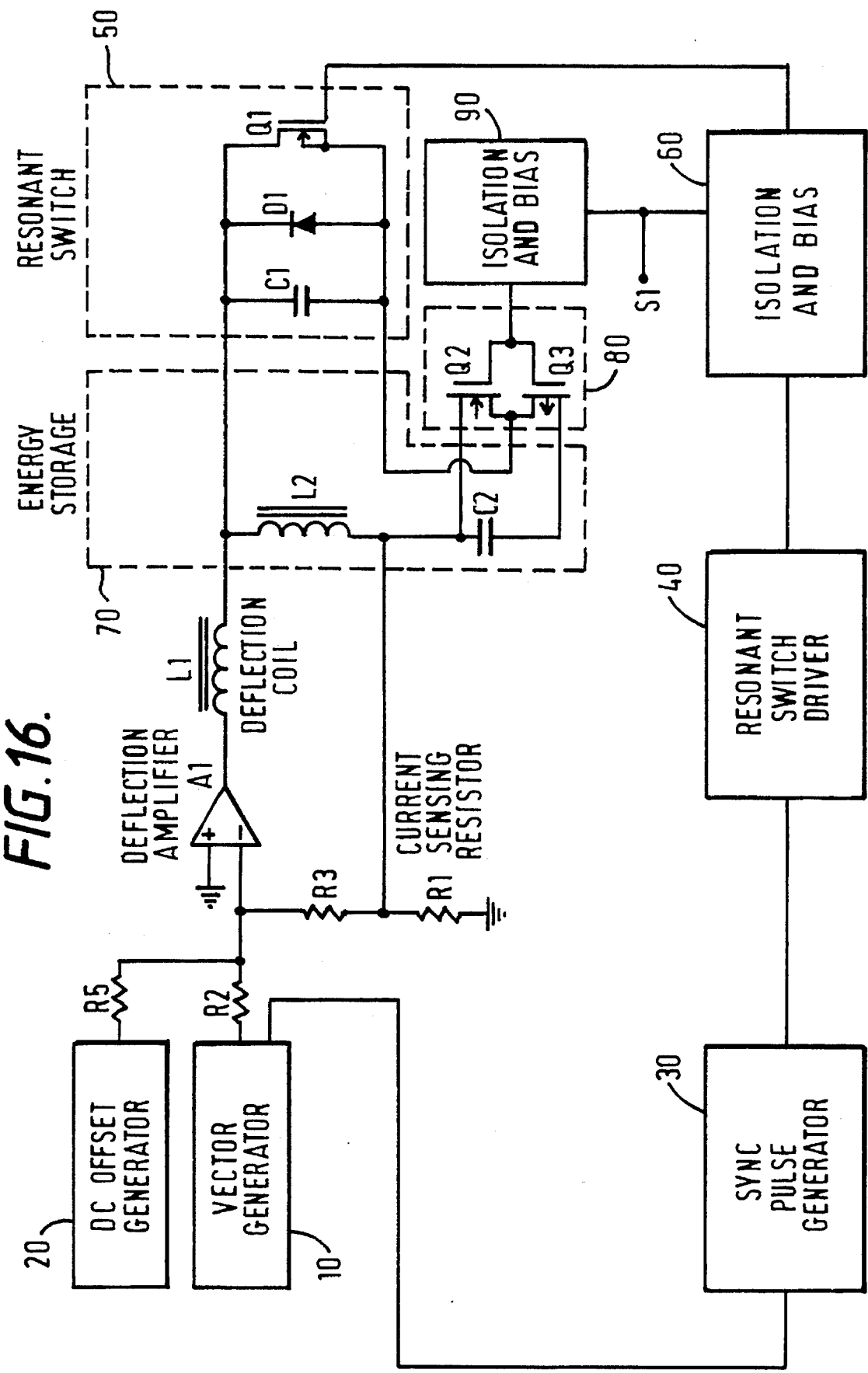
FIG. 16 is a schematic circuit diagram of a sixth embodiment of the invention, being a modification of the embodiment illustrated in FIG. 7.

Referring now to FIG. 16, this embodiment is a modification of the embodiment illustrated in FIG. 7. The performance of the circuit of FIG. 16 in resonant flyback operation is the same as that of FIG. 7, and thus the waveforms of FIGS. 8–10 are equally applicable to the circuit of FIG. 16.

The bypass circuit 80 in the embodiment of FIG. 16 comprises a pair of power MOSFET switches Q2, Q3. As shown, a complementary pair of p- and n-channel transistors may be used; in this case, the drains of the two transistors Q2, Q3 are connected across the capacitor C2 and the sources are connected in common to the circuit following C2. The gates are connected in common to a node which receives the signal determining whether the capacitor C2 is to be in circuit or isolated, from an isolation and biasing network 90 driven by a control terminal S1 providing a raster or calligraphic mode selection signal.

Thus, when a logic "high" signal is received at the common gates of switches Q2 and Q3, the N channel FET Q2 is switched on and current flows through Q2 and into the following circuit, bypassing C2. The P channel FET Q3 is switched off, and the other side of the capacitor C2, therefore isolated and floating.

On the other hand, when a logic "low" signal is received at the common gate terminals of Q2 and Q3, Q2 is switched off and Q3 is switched on. The bypass path through Q2 is therefore broken, and current flows through C2, through Q3 and into the following circuit.

Thus, a high signal at the input to the bypass circuit 80 selects calligraphic or vector mode and the low signal selects raster mode.

It would, of course, be possible to provide the bypass circuit 80 using, for example, two N channel FET devices but in this case the isolation and bias circuit 90 needs to be more complex and each gate is connected separately in order to ensure that the two switches are not switched on at the same time.

As already mentioned, in the vector mode the switch Q1 is held permanently on. Accordingly, the mode selection mode S1 is conveniently connected also to the isolation and bias circuit 60, which is arranged in response thereto to switch the switch Q1 on. The two isolation and bias circuits 60, 90 could conveniently be provided by a single network.

Seventh Embodiment of the Invention

Turning now to FIG. 17, this Figure shows a circuit in which the switch S1 of FIG. 15 is implemented using a pair of low resistance n channel power MOSFETS Q4,Q5. An AND gate 170 with one input inverted is provided in the driving circuit for the switch Q1 of the resonant switch 50, such that when the deflection system is working in calligraphic mode with the MOSFET Q4 conductive and the MOSFET Q5 non-conductive, operation of the resonant switch 50 is prevented.

Other Applications

In the above embodiments, the invention has been described in application to a cathode ray tube electron beam deflection circuit. However, it could equally be employed in circuits employing scanned electron beams in general. For example, the invention would be applicable in scanning electron microscopy, in which an electron beam is raster scanned across the surface of material to be examined and the effects of the beam are monitored. Another example of an area in which the invention may be employed is in electron beam welding, where it may be desired to produce a raster scanned electron beam directed to a surface of material to be welded.

It will therefore be understood that the invention is applicable to any area in which it may be desired to provide a line scanned electron beam, and to be able to shift the scanned position of the electron beam.

What I claim is:

1. A deflection system for driving an electron beam in a raster scan comprising:

a deflection coil;

a flyback capacitance arranged to resonate with the deflection coil;

means for switchably bypassing the flyback capacitance to prevent said resonance, and means for energizing the deflection coil with a scanning signal;

the system being characterized in that it comprises scan shift means for shifting the raster scan comprising;

means for supplying a DC offset current through said coil; and means for decoupling the DC offset current from the flyback capacitance during flyback, whereby the resonance current produced during flyback is superimposed on the offset current so as to offset the scan and flyback positions on the CRT.

2. A system according to claim 1, in which the decoupling means comprises a DC path in series with the deflection coil and in parallel with the flyback capacitor, and an AC path in series with the flyback capacitor.

3. A system according to claim 2, in which the DC path includes an inductance storing current during the scan.

4. A system according to claim 3, in which the inductance is such as to maintain a substantially constant offset current over said scan and flyback.

5. A system according to claim 3, in which the inductance is on the order of ten times that of the deflection coil.

6. A system according to claim 2, in which the AC path includes a capacitance.

7. A system according to claim 6, in which the capacitance is such as to develop during the scan substantially the whole voltage drop across the deflection coil.

8. A system according to claim 6, in which the capacitance is such as to modulate the current through the deflection coil so as to reduce the trace error due to the divergence between the CRT screen radius of curvature and the distance from the deflection centre of the cathode ray to the screen.

9. A system according to claim 1, in which the deflection coil is positioned between the energising means and the bypass means.

10. A system according to claim 1, in which the deflection coil is positioned such that a feedback loop is formed including the decoupling means and the energising means.

11. A system according to claim 1, in which the bypass means comprises a transistor switch.

12. A system according to claim 11, in which the switch comprises a field effect transistor switch.

13. A system according to claim 11, in which the control line of said switch is coupled to a control signal via isolation means.

14. A system according to claim 13, in which the isolation means comprise an opto isolator.

15. A system according to claim 1, comprising first and second flyback capacitances connected one at either end of the deflection coil to generate simultaneous opposed voltage pulses during flyback.

16. A system according to claim 1, in which the energising means comprises a feedback deflection amplifier.

17. A system according to claim 16, in which the amplifier is arranged to operate from a power supply of lower voltage than that required across the deflection coil during the raster scan.

18. A system according to claim 1, which can be operated in a vector mode in which the bypass means is operated to bypass the flyback capacitance.

19. A system according to claim 18, including selecting means effective to switch between a raster scanning mode and a vector writing mode, wherein said selecting means is effective to operate a gate means effective to operate said bypass means to bypass the flyback capacitance.

20. A system according to claim 18, further comprising means for bypassing the scan shift or scan varying circuit in said vector mode.

21. A system according to claim 20, in which the decoupling means comprises a DC path in series with the deflection coil and in parallel with the flyback capacitance, and an AC path in series with the flyback capacitance, and in which the AC path includes a capacitance and in which said scan shifting bypassing means comprises an isolation circuit arranged to isolate said capacitance.

22. An electron beam deflection system for operation in either a raster scanning mode or a vector writing mode, which comprises means for selecting between said modes, trace means, responsive to the selecting means, for providing a trace current to energise a deflection coil to scan said beam, said trace means comprising a trace capacitor providing a DC voltage across said coil; flyback means, responsive to said selecting means, for generating a resonant flyback pulse across said coil to reverse the current therethrough; and bypassing means, responsive to said selecting means, for bypass said flyback means and said trace capacitor when said selecting means indicates a vector mode.

23. A system according to claim 22, in which said bypassing means is arranged to isolate said trace capacitor, so as to maintain the charge thereon whilst said capacitor is bypassed.

* * * * *

UNITED STATES PATENT AND TRADEMARK OFFICE
CERTIFICATE OF CORRECTION

PATENT NO. : 5,488,272
DATED : January 30, 1996
INVENTOR(S) : Cotton

It is certified that error appears in the above-identified patent and that said Letters Patent is hereby corrected as shown below:

Column 7, line 56, "flys", should read --flies--

Column 9, line 9, "flys" should read --flies--

Column 12, line 51, "fixed" should read --mixed--

Column 13, line 41, "flys" should read --flies--

Column 15, line 24, "It, would" should read --It would--

Column 18, line 43, "bypass" should read --bypassing--

Signed and Sealed this

Second Day of July, 1996

Attest:

BRUCE LEHMAN

Attesting Officer

Commissioner of Patents and Trademarks